US007363129B1

(12) United States Patent
Barnicle et al.

(10) Patent No.: US 7,363,129 B1
(45) Date of Patent: Apr. 22, 2008

(54) APPARATUS, SYSTEM AND METHOD THAT INTERFACES WITH AN AUTOMOBILE ENGINE CONTROL UNIT

(75) Inventors: Daniel Barnicle, San Luis Obispo, CA (US); Joseph A. Mancuso, Santa Maria, CA (US); Peter J. Ryan, Arroyo Grande, CA (US)

(73) Assignee: Moon Valley Software, Arroyo Grande, CA (US)

( * ) Notice: Subject to any disclaimer, the term of this patent is extended or adjusted under 35 U.S.C. 154(b) by 0 days.

(21) Appl. No.: 11/620,633

(22) Filed: Jan. 5, 2007

(51) Int. Cl.
*G01M 17/00* (2006.01)
*G05D 1/00* (2006.01)

(52) U.S. Cl. .......... 701/29; 701/1; 701/102

(58) Field of Classification Search .......... 701/2, 701/29, 102
See application file for complete search history.

(56) References Cited

U.S. PATENT DOCUMENTS

| | | | | |
|---|---|---|---|---|
| 6,687,584 | B2 | 2/2004 | Andreasen et al. | |
| 7,089,099 | B2 * | 8/2006 | Shostak et al. | 701/32 |
| 7,103,460 | B1 * | 9/2006 | Breed | 701/29 |
| RE39,619 | E | 5/2007 | Andreasen et al. | |
| 2002/0133273 | A1 | 9/2002 | Lowrey et al. | |
| 2003/0231118 | A1 | 12/2003 | Kitson | |
| 2004/0024502 | A1 * | 2/2004 | Squires et al. | 701/33 |
| 2005/0119809 | A1 | 6/2005 | Chen | |
| 2005/0192727 | A1 * | 9/2005 | Shostak et al. | 701/37 |
| 2005/0207936 | A1 * | 9/2005 | Berryhill et al. | 422/63 |
| 2005/0216145 | A1 * | 9/2005 | Bellinger et al. | 701/29 |
| 2006/0090077 | A1 * | 4/2006 | Little et al. | 713/184 |

OTHER PUBLICATIONS

Air Logic Co., Ltd., "Bluetooth Module Application Note," Class 1, Bluetooth Module Production Information Data Sheet, Aug. 2004, 9 pages.
Elm Electronics, "ELM327 OBD to RS232 Interpreter," (Quick Summary), www.elmelectronics.com, Copyright 2005, 5 pages.
Elm Electronics, "ELM327 OBD to RS232 Interpreter,"(Data Sheet), www.elmelectronics.com, Copyright 2005, 43 pages.
Microchip Technology Inc., "PIC18FXX8 Data Sheet," 28/40-Pin High-Performance, Enhanced Flash Microcontrollers with CAN Module, Aug. 29, 2006, pp. 1-200.
Microchip Technology Inc., "PIC18FXX8 Data Sheet," 28/40-Pin High-Performance, Enhanced Flash Microcontrollers with CAN Module, Aug. 29, 2006, pp. 201-402.
IDSC Holdings, LLC. "PN 125033 Blue-Link?", Nexiq Technologies, http://www.nexiq.com/catalog/product_detail.asp?GID=6&item_Id=8, Copyright 2007, printed May 11, 2007, 2 pages.

(Continued)

*Primary Examiner*—John T. Kwon
(74) *Attorney, Agent, or Firm*—Thomas F. Lebens; Sinshelmer Juhnke Lebens & McIvor, LLP

(57) ABSTRACT

The present embodiments provide methods, apparatuses, and systems that interface with automobile Engine Control Units (ECU). In some embodiments, methods are provided that communicate with an ECU by establishing a wireless communication link with a remote device, coupling with an ECU, pairing the remote device with the ECU, identifying a protocol to communicate with the ECU, and transferring communications between the remote device and the ECU.

17 Claims, 18 Drawing Sheets

OTHER PUBLICATIONS

Davis, "CarChip All-in-one Driving and Engine Performance Monitor," Davis Automotive, http://www.davisnet.com/drive/products/carchip.asp, printed May 11, 2007, 3 pages.
Performance Scan, LLC., "Digimoto 5.0 DigiScan Bluetooth Package," Digimoto, http://www.digimoto.com/shop/pc-25-4-digimoto-50-digiscan-bluetooth-package.aspx, Copyright 2006, printed May 11, 2007, 1 page.
Carmd.com Corporation, "About the Product—How to Use," CarMD.com, http:www.carmd.com/AboutTheProduct/HowToUse.aspx, Copyright 2005-2007, printed May 8, 2007, 2 pages.
Autoenginuity, LLC, "OBD 2 Scan Tool—Professional PC and PDA Diagnostics," http://www.autoenginuity.com/index.html, Copyright 2003-2007, printed May 8, 2007, 2 pages.
Vital Engineering Limited, "The Car-Pal OBD-II Vehicle Interface Unit," http://www.vitalengineering.co.uk, Copyright 2006, printed May 7, 2007, 3 pages.
KBM Systems Ltd., "OBDKey Product Range:: OBD Bluetooth," http://obdkey.com/obd_bluetooth_info.asp?, Copyright 2007, printed May 7, 2007, 2 pages.
Carcheckup LLC, "Know Before You Go!" http://www.carcheckup.com/, Copyright 2002-2007,printed May 8, 2007, 2 pages.
Scantool.net, "ElmScan 5 Wireless," http://www.scantool.net/products/product_info.php?cPath=8_6&product_id=37, printed May 8, 2007, 1 page.
Burger, Guido, "Bluetooth Project Based on OBD-2 Chipset," www.blueobd.com/, Copyright 2007-2007, printed May 8, 2007, 3 pages.
I+ME ACTIA, "Blue XS Prototype," www.ime-actia.com, printed May 14, 2007, 2 pages.
UKOBD, Ltd., MBD3200BT mOByDic Bluetooth Interface, http://www.ukobd.co.uk, date first learned of publication: Jun. 8, 2007, 2 pages.
Mobile Computing Solutions, Bluetooth OBD II Interface, http://store.mo-co-so.com/bluetooth-obd-ii-interface-p-31.html, date first learned of publication: Jun. 8, 2007, 2 pages.
Ebay Motors, OBDII Scan Tool Bluetooth ISO Wireless, http://cgi.ebay.com/ebaymotors/OBDII-OBD-II-OBD2-2-Scan-Tools, date first learned of publication: Jun. 8, 2007, 6 pages.

* cited by examiner

APPARATUS, SYSTEM AND METHOD THAT INTERFACES WITH AN AUTOMOBILE ENGINE CONTROL UNIT

FIELD OF THE INVENTION

The present invention relates generally to an automobile Engine Control Unit (ECU), and more particularly to interfacing with an ECU.

BACKGROUND

Car manufacturers began installing on-board computers in consumer vehicles in the early 1980s. The original purpose of these systems was to help tune fuel injection engine. Over the next two decades, on-board computers, commonly known as Engine Control Units (ECUs), were employed for an expanding number of uses.

Some diagnostic tools are available that can directly communicate with the ECUs. Typically, however, these diagnostic tools have limited use and are generally only available for professional mechanics. These tools are often bulky, expensive, and complex in their use.

SUMMARY OF THE EMBODIMENT

The present invention advantageously addresses the needs above as well as other needs through the provisions of methods, apparatuses, and systems that interface with automobile Engine Control Units (ECU). In some embodiments, methods are provided that communicate with an ECU by establishing a wireless communication link with a remote device; coupling with an ECU; pairing the remote device with the ECU; identifying a protocol to communicate with the ECU; and transferring communications between the remote device and the ECU.

Other embodiments provide apparatuses that communicate with an ECU. Some of the apparatuses comprise a transceiver; a controller coupled with the transceiver such that the transceiver receives communications from the controller and externally transmits the communications, and further receives and forwards received external communications to the controller; an interface coupled between the controller and the ECU, where the interface interfaces communications between the controller and the ECU.

Still further embodiments provide methods of communicating with an ECU. Some of these methods receive a pairing connection command; receive a pairing request from a remote device; determine whether the pairing request is received within a pairing threshold time since the receiving of the connection command; and pair the remote device with an ECU when it is determined that the pairing request is received within the pairing threshold time.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present embodiments will be more apparent from the following more particular description thereof, presented in conjunction with the following drawings wherein.

Figure 1:
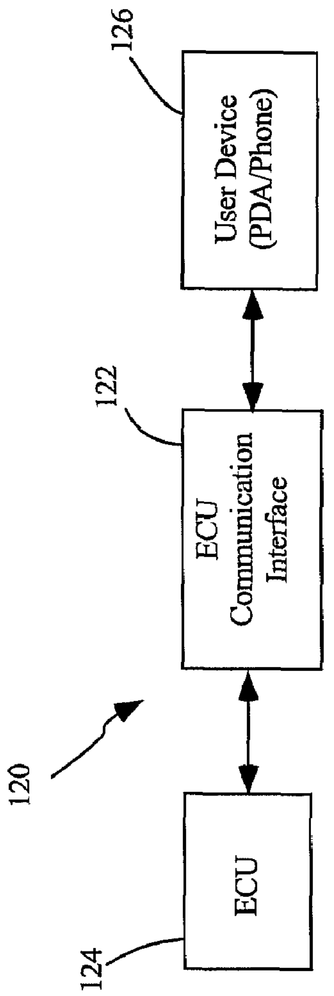
FIG. 1 depicts a simplified block diagram of an ECU system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods, systems and apparatuses for communicating with an Engine Control Unit (ECU) of an automobile. Automobile ECUs can provide information about an automobile and its operation, such as diagnostics of emissions, control of ignition and cam timing, fuel intake, the monitoring of components or devices of the automobile to sense fluid levels and other system components, and the programming of those components to improve, alter and/or optimize performance. Often the ECU is utilized in identifying problems with an automobile and/or to optimize or enhance performance.

FIG. 1 depicts a simplified block diagram of an ECU system 120 according to some embodiments. The ECU system 120 includes an ECU interface system 122 coupled between an ECU 124 of an automobile and a user interface device 126 providing communication between the ECU and the user interface device. The user interface device 126 can be substantially any device capable of providing a user with information, such as a computer, laptop computer, personal digital assistant, cell phone, and/or other relevant user devices. The ECU interface system 122 identifies an appropriate protocol to communicate with the ECU 124, and converts communications from the user device 126 into the appropriate protocol and similarly converts communications from the ECU received in the ECU protocol into a format that can be interpreted by the user device. In some embodiments, the user device stores and runs user interface programming that displays a user interface on the user device aiding the user in establishing and maintaining a connection with the ECU interface system 122, and/or in retrieving information from and issuing commands to the ECU 124. The user interface can be windows based providing one or more windows, and the user can interact with the interface through buttons, keys, pointing devices and/or other relevant user interface devices.

There are several different protocols used by different types of ECUs. In the United States, there is a set of standards, the On-Board Diagnostics II (OBD-II) standards that represent a set of independent communications protocols utilized by ECUs. Some of these protocols include Controller Area Network (CAN), International Standards Organization (ISO) 9141, Pulse Width Modulation (PWM), Variable Pulse Width (VPW), Keyword Protocol (KWP 2000) and/or other relevant protocols. Further, some of these protocols have variations, such as fast or slow initialization, varying baud rates and the like.

Figure 2:
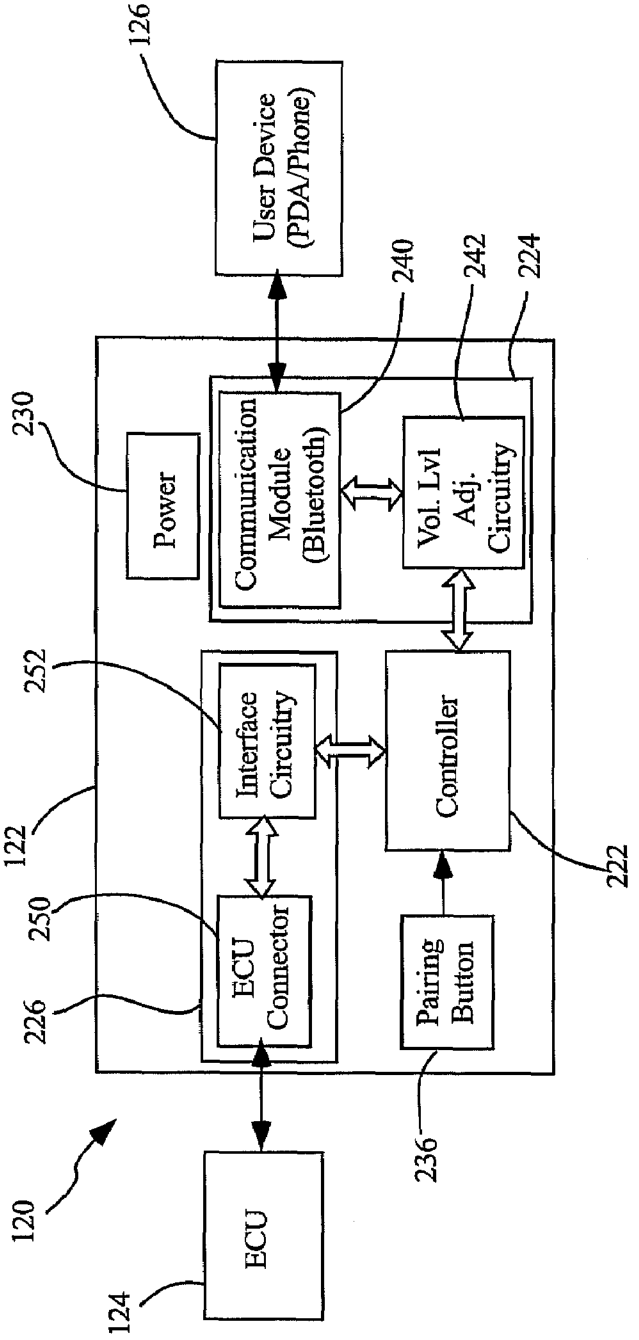
FIG. 2 depicts a simplified block diagram of the ECU system of FIG. 1 according to some embodiments that includes an ECU interface system coupled between an ECU of an automobile and a user device.

FIG. 2 depicts a simplified block diagram of the ECU system 120 of FIG. 1 according to some embodiments that includes an ECU interface system 122 coupled between an ECU 124 of an automobile and a user device 126. The ECU interface system 122 in some embodiments includes a controller 222, a user device interface 224, an ECU interface 226, one or more power sources 230, and in some instances, an activation and/or pairing button 236. The controller 222 couples with the user device interface 224, the ECU interface 226 and the activation button 236. In operation, the user device 126 communicates one or more commands and/or requests to the ECU interface system 122. The command is received through the user device interface 224 and is forwarded to the controller. The controller formats the command according to an identified protocol utilized by the ECU 124 and forwards the formatted command to the ECU interface 226 that communicates the command to the ECU 124. Similarly, the ECU issues responses to the commands or requests that are received by the controller 222 through the ECU interface. The controller formats the responses and forwards the responses to the user device 126 through the user device interface 224.

The user device interface 224 can be implemented in part through physical wiring (e.g., RS-232, optical, etc.), wireless transmission and/or connection (e.g., cellular, Bluetooth, infrared, optical, etc.) and/or other relevant methods of communication. In some implementations, the user device interface 224 includes a communication module 240, such as a Bluetooth module or other communication module and/or combinations of modules that can communicate with the user device 126 over wireless or wired communication links. Further, a voltage level adjustment circuitry 242 can be included in some implementations to adjust voltage levels of signals communicated between the controller 222 and the communication module 240 when needed. For example, in some instances a Bluetooth module may operate at a voltage level that is different than the operating voltage level of the controller 222 and as such the voltage level of the signals from the controller to the Bluetooth module are adjusted (e.g., reduced) by the voltage level adjustment circuitry 242. Additionally or alternatively, the voltage levels of communications from the Bluetooth module may be adjusted (e.g., increased) by the voltage level adjustment circuitry on route to the controller. The power source 230 can provide one or more voltage levels to the components of the ECU interface system 122. Further, one or more voltage regulators can be cooperated with the controller and/or interfaces as further described below.

The ECU interface 226 can include a connector 250 that couples with the ECU 124 (or connector coupled with the ECU) of the automobile, and interface circuitry 252 that couples between the connector 250 and the controller 222. In some embodiments, the connector is an OBD-II connector according to Society of Automotive Engineers (SAE) J1962 standards. The interface circuitry 252 can in some implementations provide some protocol conversion and/or provide other relevant voltage level adjustments, biasing and/or other relevant circuitry.

The controller 222 can be substantially any relevant controller capable of controlling the communication between the user device 126 and the ECU 124. In some implementations, the controller can be a computer, laptop, one or more microprocessors, one or more microcontrollers, state machines or other relevant controllers. In some instances, the controller is implemented at least in part through an integrated circuit that provides the desired protocol conversion and communication control. For example, the controller may be implemented at least in part through a ELM327 microcontroller and/or other similar microcontrollers manufactured by Elm Electronics of Canada, a Peripheral Interface Controller (PIC), such as a PIC18F2580, PIC18F248 and/or other relevant controllers manufactured by Microchip Technologies, Inc. of Chandler, Ariz., and/or other such controllers or combinations of controllers.

Figure 3:
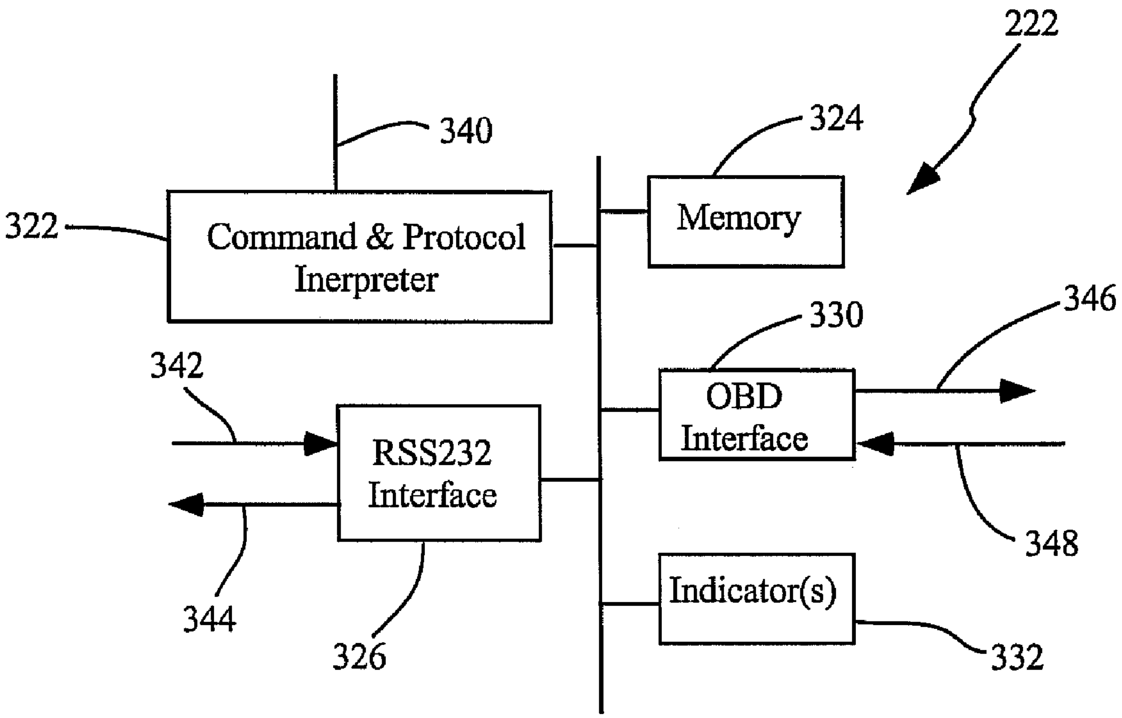
FIG. 3 depicts a simplified block diagram of a controller according to some embodiments.

Communications from the user device 126 are received by the controller 222 and formatted to be passed to the ECU 124. The formatting in part utilizes an appropriate protocol for the ECU and formats the communication according to the protocol. FIG. 3 depicts a simplified block diagram of a controller 222 according to some embodiments. The controller includes a command and protocol interpreter 322, memory 324, a first controller interface 326 (e.g., an RS232 interface or other similar data interconnection interface), and a second controller interface 330 (e.g., an OBD interface). Some embodiments optionally further include operating indicators 332 and/or outputs to drive indicators (e.g., LEDs and/or other such indicators).

A timing or clock signal 340 is received by the command and protocol interpreter 322 providing timing to the operation of the controller 222. The command and protocol interpreter 322 determines an appropriate protocol to utilize with a coupled ECU, and configures commands and/or requests according to the identified protocol and/or configures replies from the ECU to be forwarded to the user device 126 through the communication module 240. The first controller interface 326 couples with the user device interface 224, and includes at least one input 342 to receive communications from the client device and at least one output 344 to forward communications to the user devices. Similarly, the second controller interface 330 couples with the ECU interface 226, and includes at least one input 346 to receive communications from the ECU and at least one output 348 to forward communications to the ECU.

In many instances the controller 222 is implemented through a single Integrated Chip (IC) and includes processing and/or programming capabilities through the command and protocol interpreter 322. The memory 324 can store executables, software, firmware, data, readable instructions, data structures, program modules and/or parameters for use in implementing the transfer of communications. Further, the memory can include substantially any processor-readable or computer-readable media that can be accessed by the command and protocol interpreter, and can include volatile and/or nonvolatile media, buffers, registers, arrays and/or other memory structures. In some embodiments, some or all of the memory can be external to the controller 222.

As described above, the user device interface 224 can include the voltage level adjustment circuitry 242 and a communication module 240. In some embodiments, the communication module wirelessly communicates with the user device, such as through Bluetooth wireless communication and/or connection. In some instances, the Bluetooth module can be implemented through a Blue Smirf Bluetooth chip, manufactured by Spark Fun of Boulder, Colo.; a BR-C30 Bluetooth module, manufactured by Blue Radios of Englewood, Colo.; an ABM 450 Bluetooth module, manufactured by Air Logic of Seoul, Korea; an ABM 600-1 Bluetooth module, manufactured by Air Logic; and/or other relevant Bluetooth transceivers. The Bluetooth module allows the ECU interface system 122 to wirelessly communicate with the user device having Bluetooth wireless communication capabilities. Further in some implementations, a ground plane is positioned beneath the Bluetooth module, and an antenna is coupled with the Bluetooth module. In those instances where the Bluetooth module is mounted on a circuit board with the controller 222, the antenna can be formed and/or placed on the board. Additionally in some embodiments, a spacing is maintained around the antenna (e.g., a spacing of about 8 mm) that is substantially free of metallic components.

Figure 4:
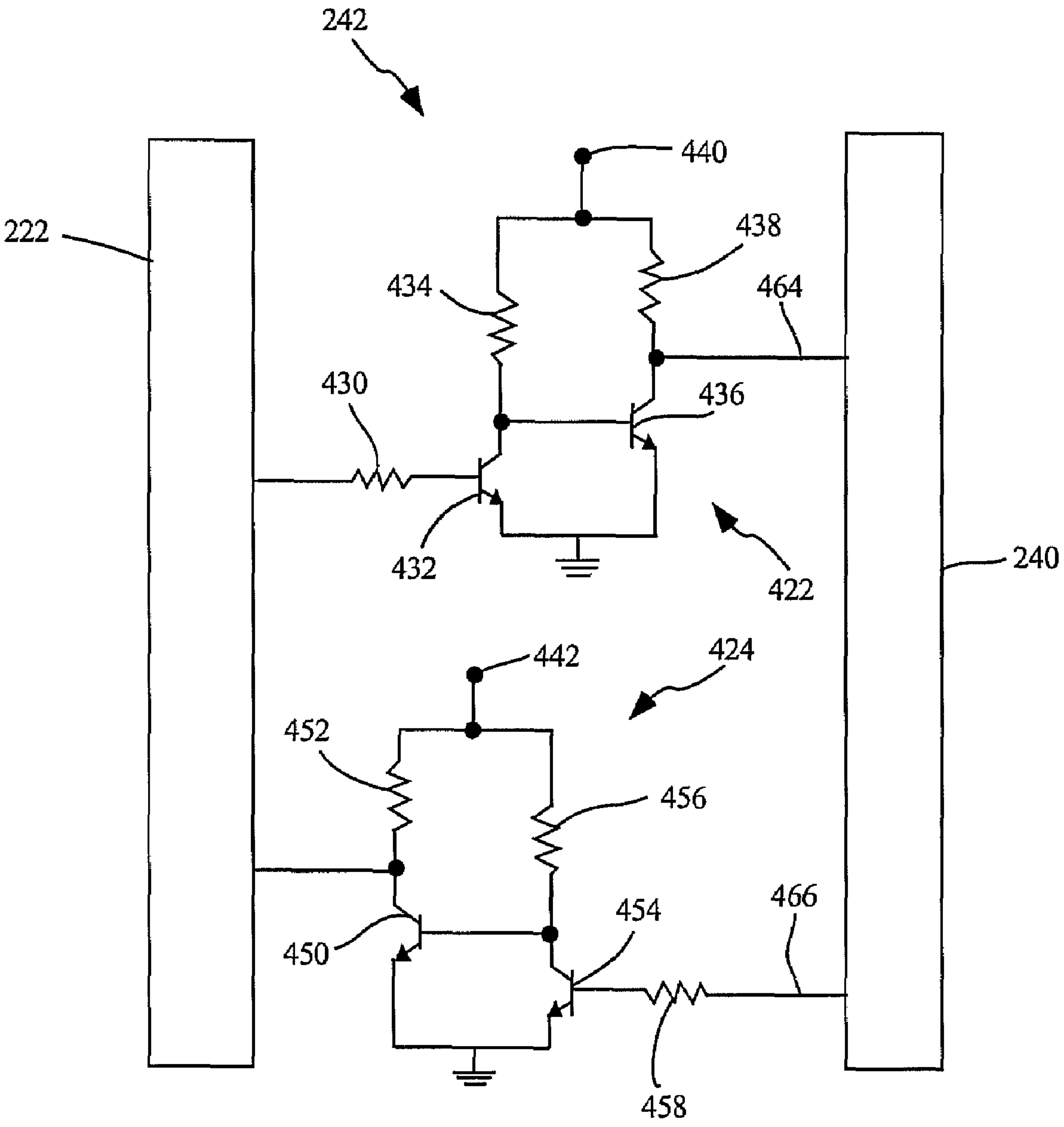
FIG. 4 depicts a simplified schematic diagram of an example implementation of a voltage level adjustment circuitry according to some embodiments.

Some embodiments additionally include the optional voltage level adjustment circuitry 242 that provides voltage level adjustments of signals communicated between the controller 222 and the communication module 240. FIG. 4 depicts a simplified schematic diagram of an example implementation of the voltage level adjustment circuitry 242 according to some embodiments. The voltage level adjustment circuitry 242 in these embodiments includes a down-voltage adjustment circuitry 422 and an tip-voltage adjustment circuitry 424. The down-voltage adjustment circuitry comprises a serial resistor 430 coupled between the controller 222 and a base of a first transistor 432. A first voltage resistor 434 couples between the collector of the first transistor and a first voltage source 440, such as about 3V voltage source. The collector of the first transistor further couples with the base of a second transistor 436. The collector of the second transistor coupled with a second voltage resistor 438 that couples with the first voltage source. The collector of the second transistor further couples with the communication module 240 over a communication receiving line 464. The emitters of the two transistors couple with ground or other reference voltage.

The up-voltage adjustment circuit 424 includes a first transistor 450 with the collector coupled with the controller 222. A third voltage resistor 452 couples between the base and a second reference voltage source 442, such as a 5V voltage source. The base of the first transistor couples with the collector of a second transistor 454. A fourth voltage resistor 456 couples between the second reference voltage source 442 and the collector of the second transistor 454. A serial resistor 458 couples between the base of the second transistor and the communication module 240 establishing a communication transmitting line 466. The emitters of the two transistors couple with ground or other reference voltage.

The voltage adjustment circuitry 242 provides voltage level conversions or adjustments for communications between the communication module 240 and the controller 222. For example, when the communication module comprises a Bluetooth module that operates at a reference voltage of about 3.3V and the controller is a microcontroller operating at a reference voltage of about 5V, the down-voltage adjustment circuitry 422 reduces the voltage level of communications from the controller 222 prior to being received at the Bluetooth module. Similarly, the up-voltage adjustment circuitry 424 increases the voltage level of communications from the Bluetooth module prior to being received at the controller 222. In some implementations, the transistors 432, 436, 450 and/or 454 can be NPN transistors, such as 2N3904 transistors or other relevant transistors. Further, in some implementations the resistance values for the voltage adjustment circuitry 242 can be about 4.7KΩ.

The voltage adjustment circuitry 242, however, can vary depending on the controller 222 and/or communication module 240 being utilized. For example, alternatively or additionally the voltage adjustment circuitry can be implemented by and/or include an intermediate chip that performs voltage adjustments, such as a MAX232 chip installed between the controller 222 and the communication module 240 and/or a serial cable or other wiring (e.g., RS232 cable). Similarly, the interface circuitry 252 can also vary depending on the controller 222, connector 250 and/or ECU 124.

Figure 5:
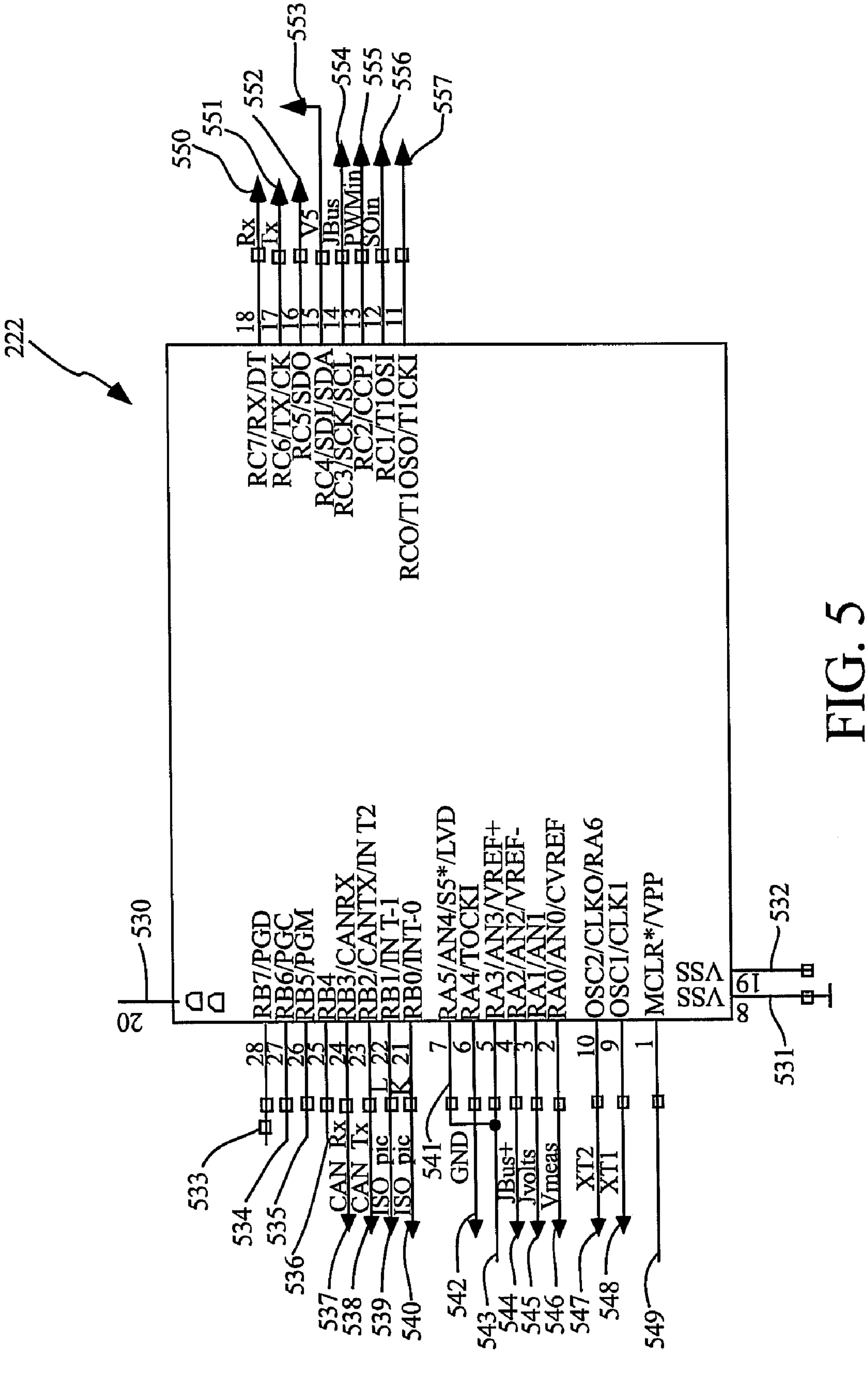
FIG. 5 depicts a simplified block diagram of a controller implemented according to some embodiments through a single integrated circuit microcontroller.

FIG. 5 depicts a simplified block diagram of a controller 222 implemented according to some embodiments through a single integrated circuit microcontroller. The controller 222 includes a number of inputs and outputs. In some implementations, the controller includes twenty eight (28) input and/or output pins. These pins can include positive supply voltage (VDD) 530; ground voltage reference (VSS) 531, 532; digital I/O, in-circuit debugger pin, interrupt-on-change pin, ICSP programming data (RB7/PGD) 533; digital I/O, in-circuit debugger pin, interrupt-on-change pin, ICSP programming clock (RB6/PGC) 534; digital I/O, interrupt-on-change pin, low-voltage ICSP, programming enable (RB5/PGM) 535; digital I/O, interrupt-on-change pin (RB4) 536; digital I/O, receive signal for CAN bus (RB3/CANRX) 537; digital I/O, transmit signal for CAN bus, external interrupt 2 (RB2/CANTX/INT2) 538; digital I/O, external interrupt 1 (RB1/INT1) 539; digital I/O, external interrupt 0 (RB0/INT0) 540; digital I/O, analog input 4, SPI slave select input, low-voltage detect input (RA5/AN4/SS*/LVD) 541; digital I/O, Timer0 (RA4/TOCK1) 542; digital I/O, analog input 3, A/D reference voltage (high input) (RA3/AN3/VREF+) 543; digital I/O, analog input 2, A/D reference voltage (low input) (RA2/AN2/VREF−) 544; digital I/O, analog input 1 (RA1/AN1) 545; digital input/output, Analog input 0 comparator voltage reference output (RA0/AN0/CVREF) 546; oscillator crystal or external clock output or general purpose input/output (OSC2/CLKO/RA6) 547; oscillator crystal or external clock input (OSC1/CLK1) 548; master clear (input) (MCLR*) or programming voltage output (VPP) 549; digital I/O, USART asynchronous receive, USART synchronous data (RC7/RX/DT) 550; digital I/O, USART asynchronous transmit, USART synchronous clock (RC6/TX/CK) 551; digital I/O, SPI data out (RC5/SDO) 552; digital I/O, SPI data in, $I^2C$ data I/O (RC4/SDI/SDA) 553; digital I/O, synchronous serial clock input/output for SIP mode, synchronous serial clock input/output for $I^2C$ mode (RC3/SCK/SCL) 554; digital I/O, Capture 1 input/compare 1 output/PWM1 output (RC2/CCP1) 555; digital I/O, timer1 oscillator input (RC1/T1OSI) 556; and digital I/O, Timer1 oscillator output, Timer1/Timer3 external clock input (RC0/T1OSO/T1CK1) 557. Other pins can additionally or alternatively be included.

Figure 6:
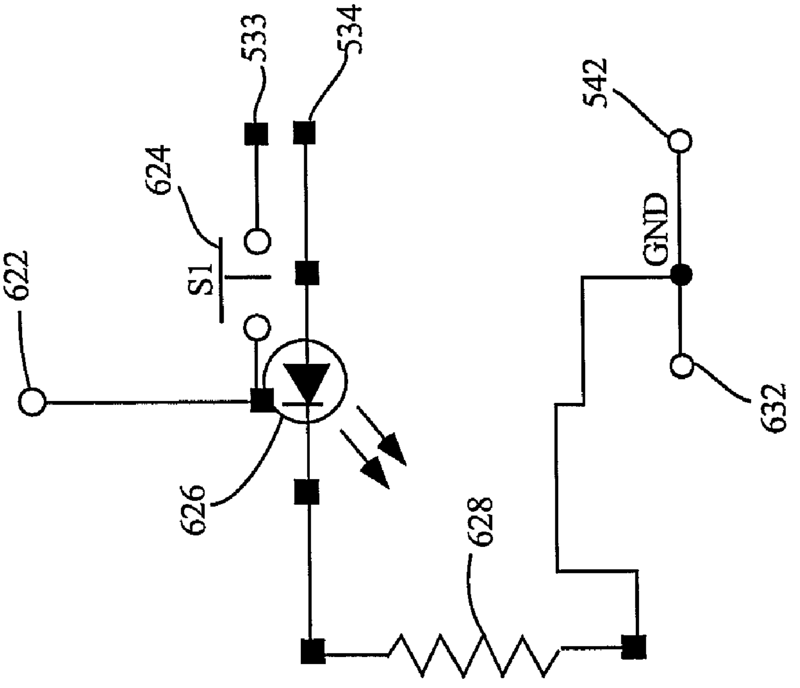
Figure 13:
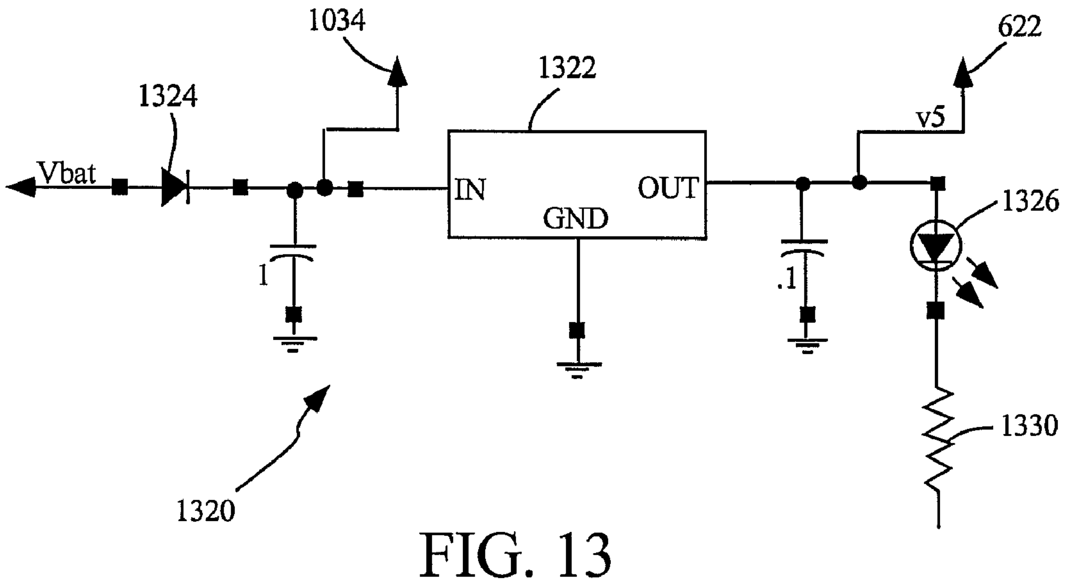
Figure 14:
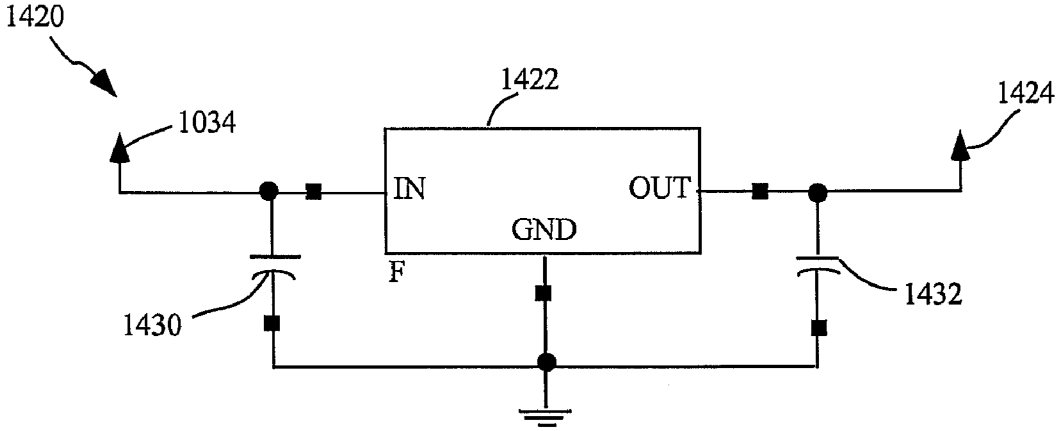
Figure 16:
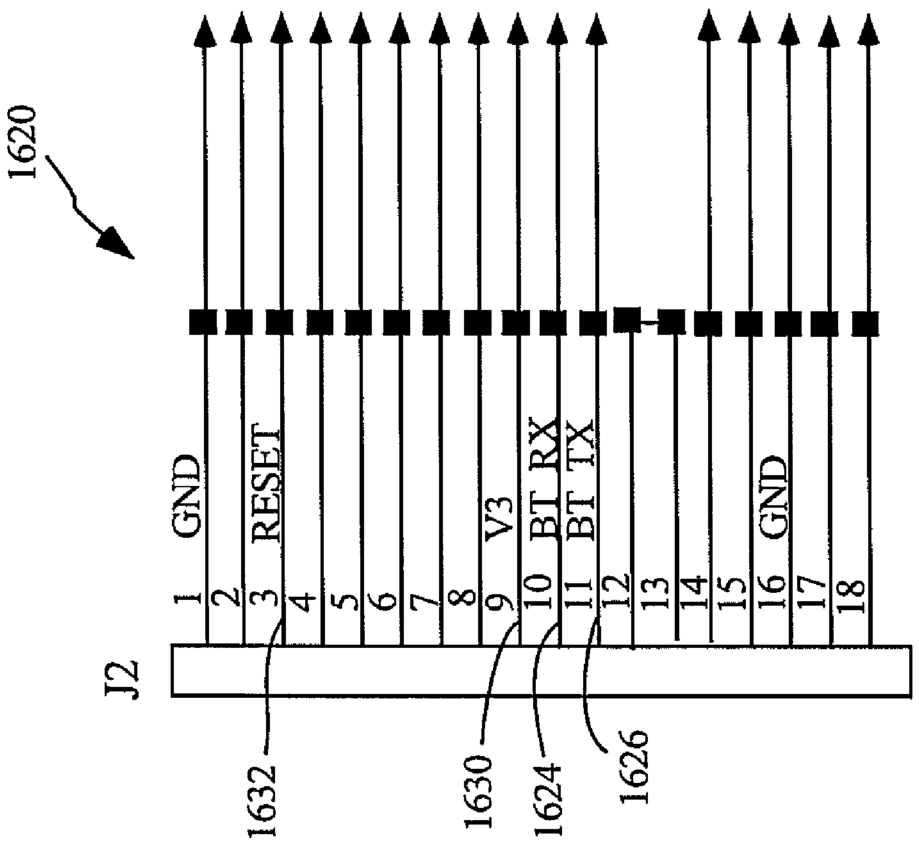
FIGS. 15-16 show pin layouts of the ECU connector and a connector to couple between the voltage adjustment circuit and the communication module.
Figure 15:
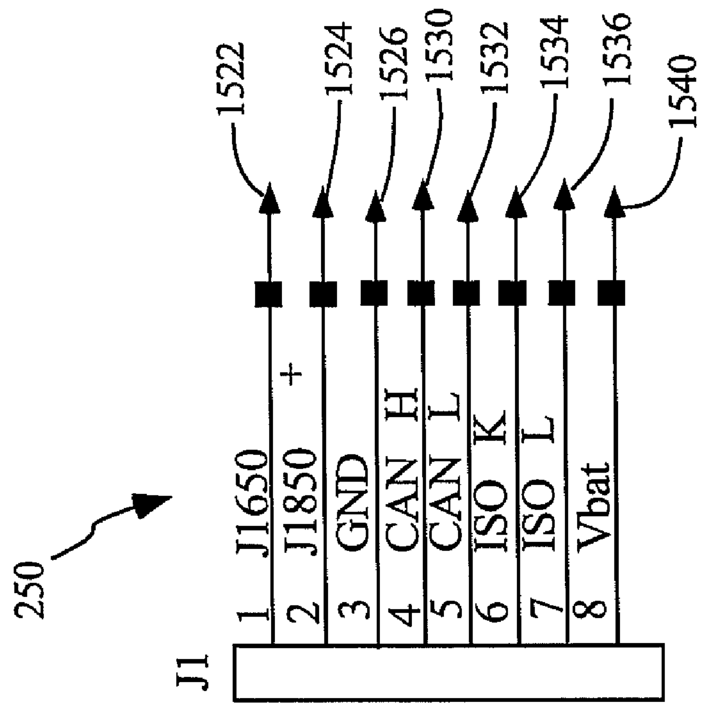

FIGS. 6-14 show simplified schematic diagrams of the interface circuitry 252 according to some embodiments and the coupling of the interface circuitry with the controller 222. For simplicity, the controller 222 is not shown in FIGS. 6-14 and the coupling is identified by reference numbers of the pin connections of the controller 222 depicted in FIG. 5. FIGS. 15-16 show pin layouts of the ECU connector 250 and a connector 1620 to couple between the voltage adjustment circuit 242 and the communication module 240. Referring to FIGS. 5 and 6, the RB7/PGD pin 533 couples with a first reference voltage 622 (e.g., 5V) through a first switch 624. In some embodiments, the first switch can be the activation or pairing button 236 that actives the ECU interface system 122 as described further below. The RB6/PGC pin 534 couples with the RA4/T0CK1 pin 542 through a diode 626 and a resistor 628. In some instances the diode is an LED or other such diode (e.g., a green diode) providing information about the operation of the ECU interface system 122, and/or the resistor can have a value of 470Ω. The RA4/TOCK1 pin 542 further couples with a ground pin 1526 of the ECU connector 250.

Figure 7:
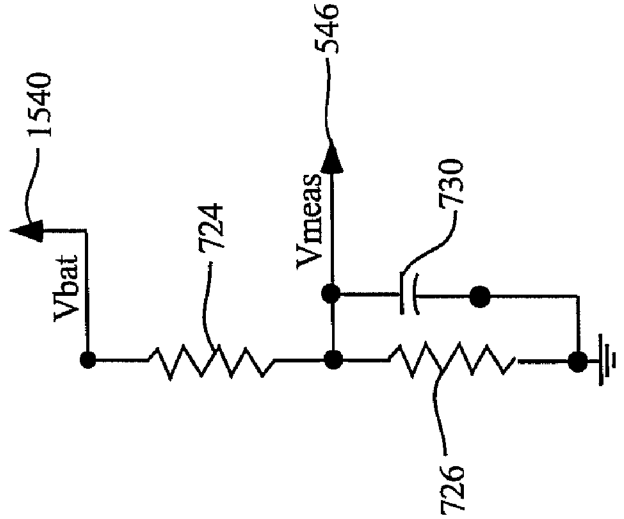
FIGS. 6-14 show simplified schematic diagrams of interface circuitry according to some embodiments and the coupling of the interface circuitry with the controller.
Figure 8:
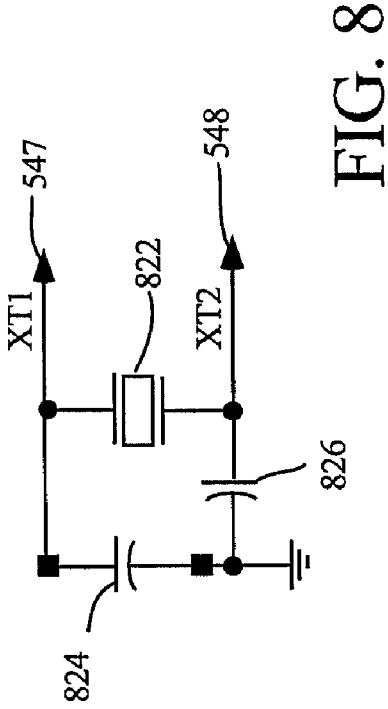

Referring to FIGS. 5 and 7, the RA0/AN0/CVREF pin 546 couples with a battery voltage read pin (Vbat) 1540 through a first resistor 724, and with ground through a second resistor 726 coupled in parallel with a capacitor 730. The battery voltage read Vbat pin 1540 is a pin of the ECU connector 250 that couples with the ECU 124 such that the RA0/AN0/CVREF pin 546 can receive measured data from the ECU. Referring to FIGS. 5 and 8, an oscillator crystal 822 couples between the OSC2/CLKO/RA6 pin 547 and the OSC1/CLK1 pin 548 providing timing to the controller 222. Further a pair of capacitors 824, 826 can couple between the OSC2/CLK0/RA6 pin 547 and ground and the OSC1/CLK1 pin 548 and ground. The crystal can provide substantially any relevant oscillation signal, and in some embodiments is greater than 1 MHz, for example, the crystal can provide a 4 MHz signal, a 20 MHz signal or other relevant oscillation signal(s). Further, the pair of capacitors can, in some implementations for example, have capacitances of 20 pF.

Figure 9:
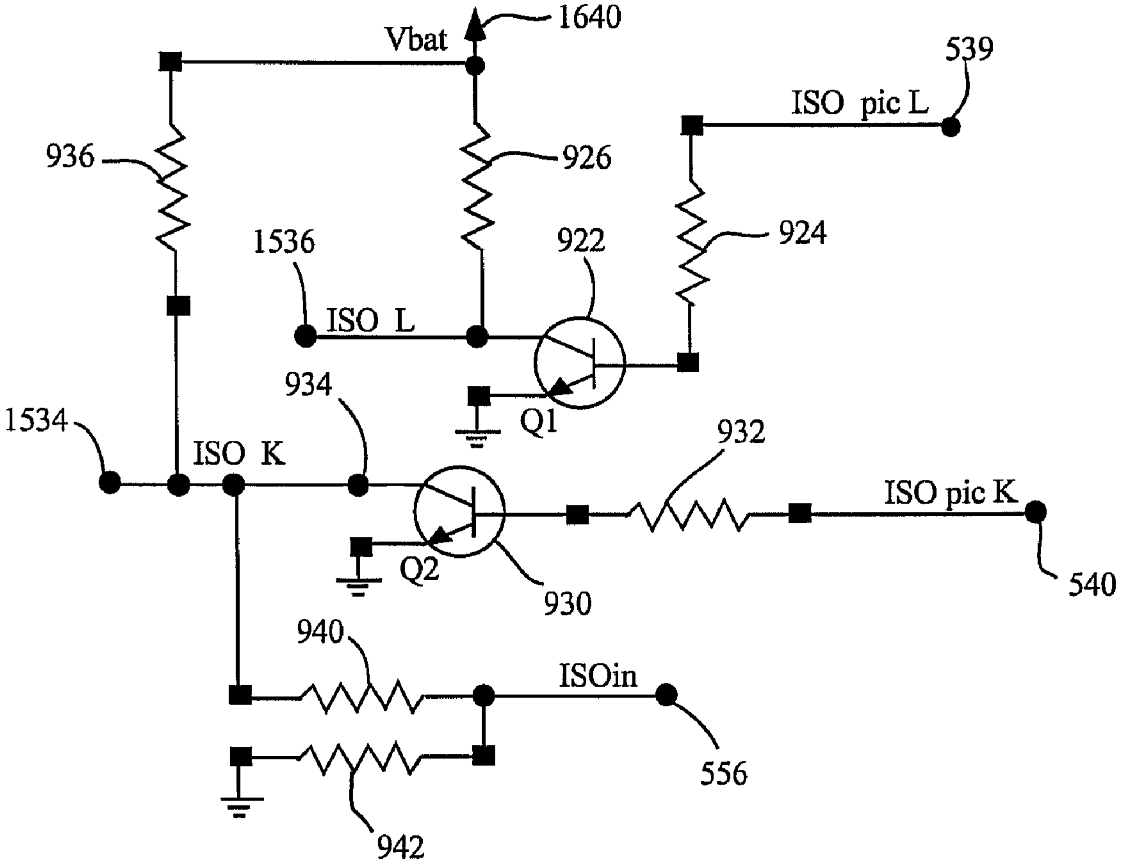

Referring to FIGS. 5, 9 and 15, RB1/INT1 pin 539 and the RB0/INT0 pin 540 can drive the ISO 9141 and ISO 14230 (KWP 2000) protocol buses. The RB1/INT1 pin 539 can provide a protocol output that couples with the base of a first transistor 922 through a resistor 924. The collector of the transistor 922 couples with an ISO_L line 928 that further couples with an ISO_L pin 1536 of the connector 250 to drive the ISO 9141 and/or KWP 2000 buses on the ECU 124. In driving the ISO 9141 bus, some embodiments are configured such that communications are sent at a maximum interval of 5 seconds in order to keep the bus alive. The collector further couples with Vbat pin 1540 of a connector 250 through a resistor 926. Similarly, the RB0/INT0 pin 540 provides a secondary protocol output that couples with the base of a second transistor 930 through a resistor 932. The collector of the transistor 930 couples with an ISO_K line 934 that further couples with an ISO_K pin 1534 of the connector 250 to drive the ISO 9141 and/or KWP 2000 buses on the ECU 124. The collector further couples with the Vbat pin 1540 of a connector 250 through a resistor 936. The RC1/T1OSI pin 556 provides an input for ISO 9141 and KWP 2000 protocols and, in some instances, is derived from the ISO_K line 934. In some embodiments, the RC1/T1OSI pin 556 couples with the ISO_K line 934 between a pair of resistors 940, 942. In an example implementation according to some embodiments, the transistors can be 2N3904 transistors, and the resistors 926 and 936 can be about 510Ω, resistors 924 and 932 can be about 2.2KΩ, resistor 940 can be about 47KΩ and resistor 942 can be about 22KΩ.

Figure 10:
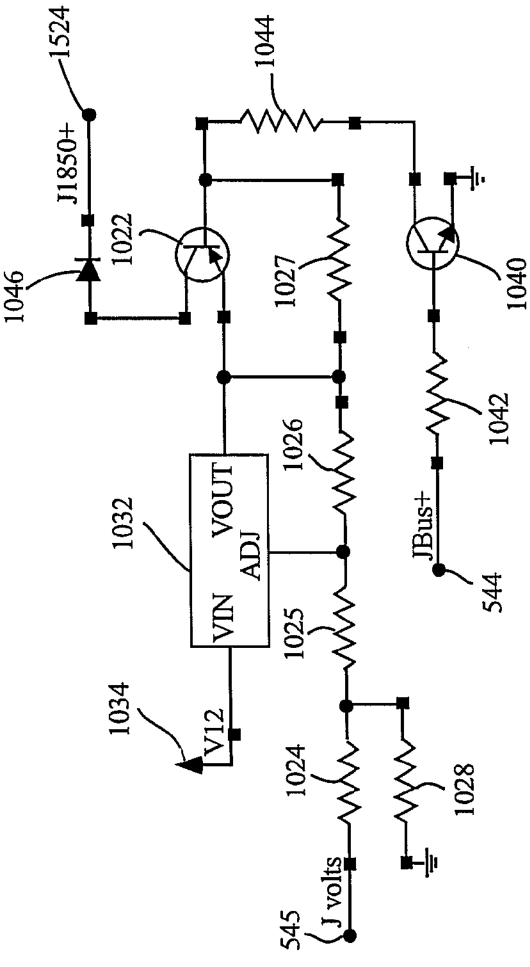

Referring to FIGS. 5, 10 and 15, the RA1/AN1 pin 545 provides an output used to control a voltage supplied to a J1850 Bus+ output at the RA0/AN0/CVREF pin 546. For example, in some instances a nominal 8V is used for J1850 VPW, while 5V is used with J1850 PWM protocol communications. The RA1/AN1 pin 545 couples with a base of first transistor 1022 through a resistive network of four resistors in series 1024-1027 with a resistor 1028 between the first and second resistors 1024 and 1025 to ground. The first transistor 1022 further couples with a voltage regulator 1032 the couples with a second reference voltage 1034 (e.g., 12V reference voltage) with an adjustment input connected between the second and third resistors 1025 and 1026. Further, the RA2/AN2/VREF− pin 544 couples with the base of a second transistor 1040 through a resistor 1042. The collector of the transistor further couples with the base of the first transistor 1022 through a resistor 1044. The first transistor further couples with a J1850+ pin 1524 of the connector 250 through a diode 1046. In some implementations the first transistor 1022 can be a 2N3906 transistor, the second transistor 1040 can be a 2N3904 transistor, the voltage regulator can be a U2LM317L regulator, the diode 1046 can be a 1N4148 diode, the first, second and fifth resistors 1024, 1025 and 1028, respectively, can have a about 470Ω resistance, the third resistor 1026 can be about 240%, the fourth resistor 1027 can be about 10KΩ, and the resistors 1042 and 1044 can be approximately 4.7KΩ.

Figure 11:
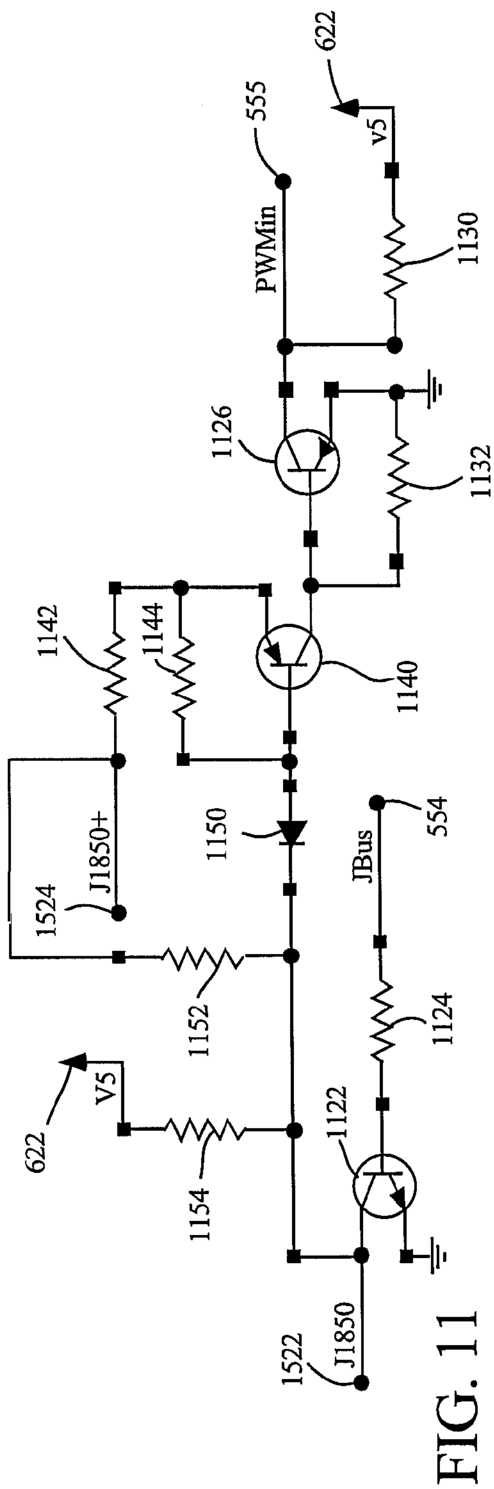

Referring to FIGS. 5, 11 and 15, the RC3/SCK/SCL pin 554 (Jbus−) is an output that drives the J1850 Bus− line of the ECU 124. The Jbus− pin 554 couples with the base of a first transistor 1122 through a first resistor 1124. The collector of the first transistor couples with the J1850− pin 1522 of the connector 250. Further, the RC2/CCP1 pin 555 (PWMin) is an input for J1850 PWM protocol communications and couples with the collector of a second transistor 1126 and the first reference voltage 622 through a pull-tip resistor 1130. A base of the second transistor couples with a collector of a third transistor 1140 and a first base resistor 1132 further couples between the base and emitter of the second transistor. The emitter of the third transistor further couples with the J1850+ pin 1524 of the connector 250 through a resistor 1142. A second base resistor 1144 couples between the emitter and the base of the third transistor. The base of the third transistor further couples through a diode 1150 and a resistor 1152 to the J1850+ pin of the connector 250 and in some embodiments to the first reference voltage 622 through a pull-up resistor 1154. The pull-up resistor 1154 can provide an idling voltage of about 5V and an active voltage of about 0V for PWM signaling that can in part avoid the J1850− bus from staying at a 0V and consequently being in an active state when not desired. In an example implementation according to some embodiments, the first and second transistors can be implemented with 2N3904 transistors and the third transistor can be a 2N3906 transistor, the resistors 1124, 1130, 1154 could be about 4.7KΩ, the first base resistor 1132 and the resistor 1142 can be about 10KΩ, the second base resistor 1144 can be about 100KΩ and the resistor 1152 could be about 22KΩ.

Figure 12:
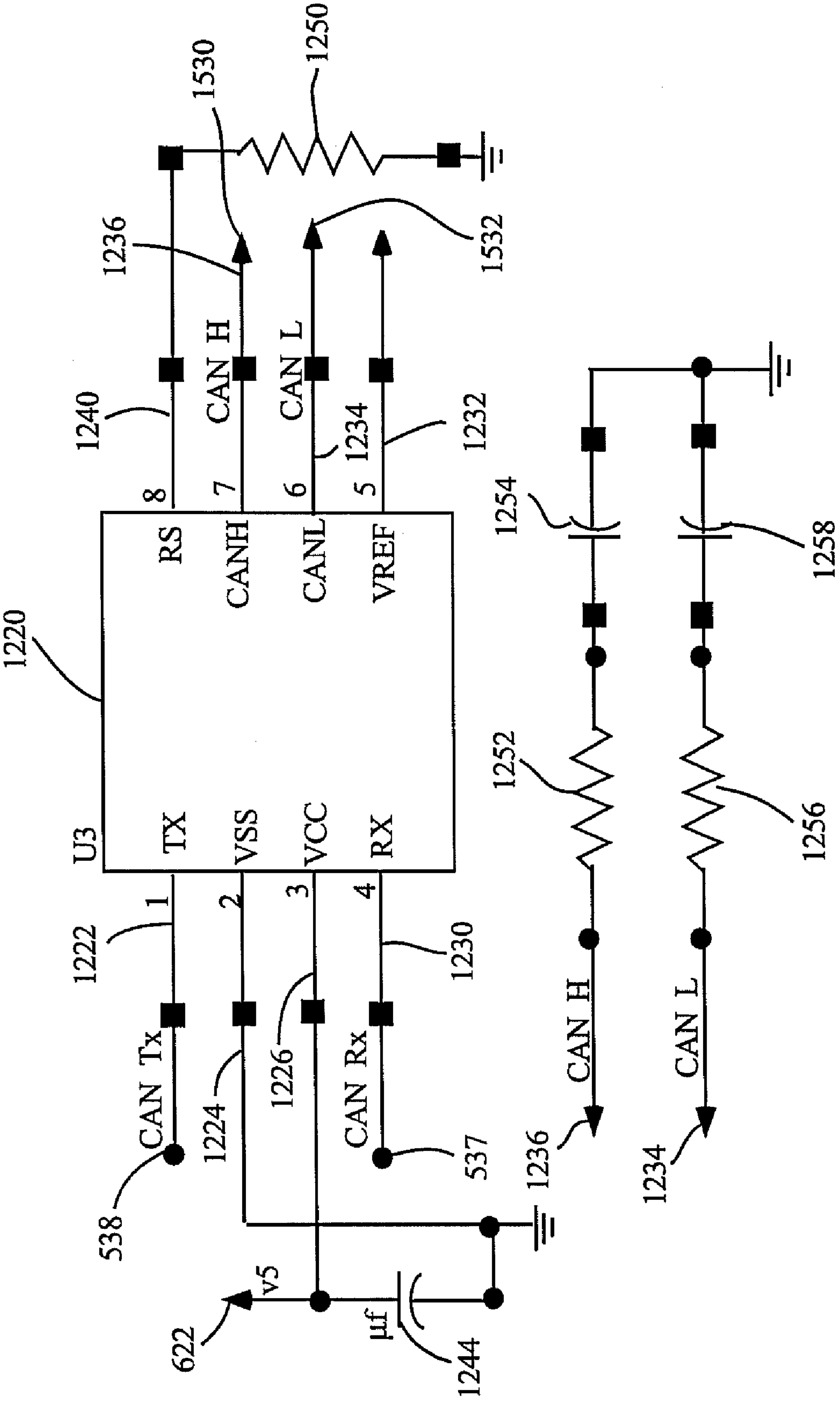

Referring to FIGS. 5, 12 and 15, some embodiments employ a CAN transceiver 1220, that in some instances is implemented in part through an integrated circuit, such as an MCP2551 chip or other relevant CAN transceiver, that provides protocol conversion for one or more of the CAN protocols (e.g., CAN (ISO 15765-4)-11 bit ID, 500 Kbaud (CAN-F11); CAN (ISO 15765-4)-29 bit ID, 500 Kbaud (CAN-F29); CAN (ISO 15765-4)-11 bit ID, 250 Kbaud (CAN-S11); CAN (ISO 15765-4)-29 bit ID, 250 Kbaud (CAN-S29)). The CAN transceiver can include a TX pin 1222, a VSS pin 1224, a VCC pin 1226, an RX pin 1230, a VREF pin 1232, a CAN_L pin 1234, a CAN_H pin 1236 and an RS pin 8.

The TX pin 1222 couples with the RB2/CANTX/INT2 pin 538 of the controller 222 that transmits CAN protocol communications to the CAN transceiver 1220. The RX pin 1230 couples with the RB3/CANRX pin 1237 of the controller 222 to forward CAN communications received from the ECU to the controller 222. The VSS pin 1224 couples with ground and the VCC pin 1226 couples with the first reference voltage 622 with a capacitor 1244 coupled between the VCC pin 1226 and ground. The RS pin 1240 couples through a resistor 1250 to ground. The CAN_L pin 1234 couples with a CAN_L pin 1530 of the connector 250 and the CAN_H pin 1236 couples with a CAN_H pin 1526 of the connector 250 to establish the communication path between the TX pin 1222 and RX pin 1230 and the ECU 124. In some embodiments the CAN_H pin 1236 can further couple with ground through a resistor 1252 and capacitor 1254 and similarly the CAN_L 1234 pin can couple with ground through a resistor 1256 and capacitor 1258. In an example implementation according to some embodiments, the CAN transceiver 1220 can be implemented with an MCP2551 transceiver, the capacitor 1244 can be approximately 0.1 μF, the resistor 1250 can be about 4.7KΩ, the resistors 1252 and 1256 can be approximately 100KΩ, and the capacitors 1254 and 1258 can be about 560 pF. Further, in some instances, the connector 250 complies with the SAE J1962 standard.

In some embodiments, the interface circuitry 252 can include additional voltage regulators to define reference voltages, such as a reference voltage for the controller 222 (e.g., at 5V) and a reference voltage for the communication module 240 (e.g., at about 3V). FIGS. 13 and 14 show simplified schematic diagrams of voltage regulator circuits 1320 and 1422, respectively. Referring to FIG. 13, a voltage regulator 1322 has in input coupled with the second reference voltage 1034 (e.g., 12V), with the battery voltage read Vbat pin 1540 coupled to the second reference voltage through a diode 1324. An output of the regulator generates the first reference voltage 622 (e.g., about 5V), and is further coupled to with a diode 1326 (e.g., an LED) and resistor 1330 to ground with a capacitor 1332 in parallel with the diode and resistor. In an example implementation the voltage regulator 1322 can be an LM7805 regulator or other relevant voltage regulator with the diode being a 1N4001 diode, the LED 1326 can be a red LED, the resistor 1330 can be about 470Ω and the capacitor can be about 0.1 μF. The voltage regulator 1422 of FIG. 14 similarly can couple with the second reference voltage 1034 and generate a third reference voltage 1424, such as about a 3V reference voltage. The input and output can each couple with a capacitor 1430, 1432 having values, for example, of about 0.1 μF. The voltage regulator 1422 can be implemented with a 78RM33 regulator or other relevant regulator. The 5V and 3V regulators 1322 and 1422, respectively, can be used for power. As described above, the regulators used to implement the voltage regulator circuitry 1320 and 1420 are not critical, and in some embodiments, the regulators attempt to supply about 500 mA of current.

Figure 17:
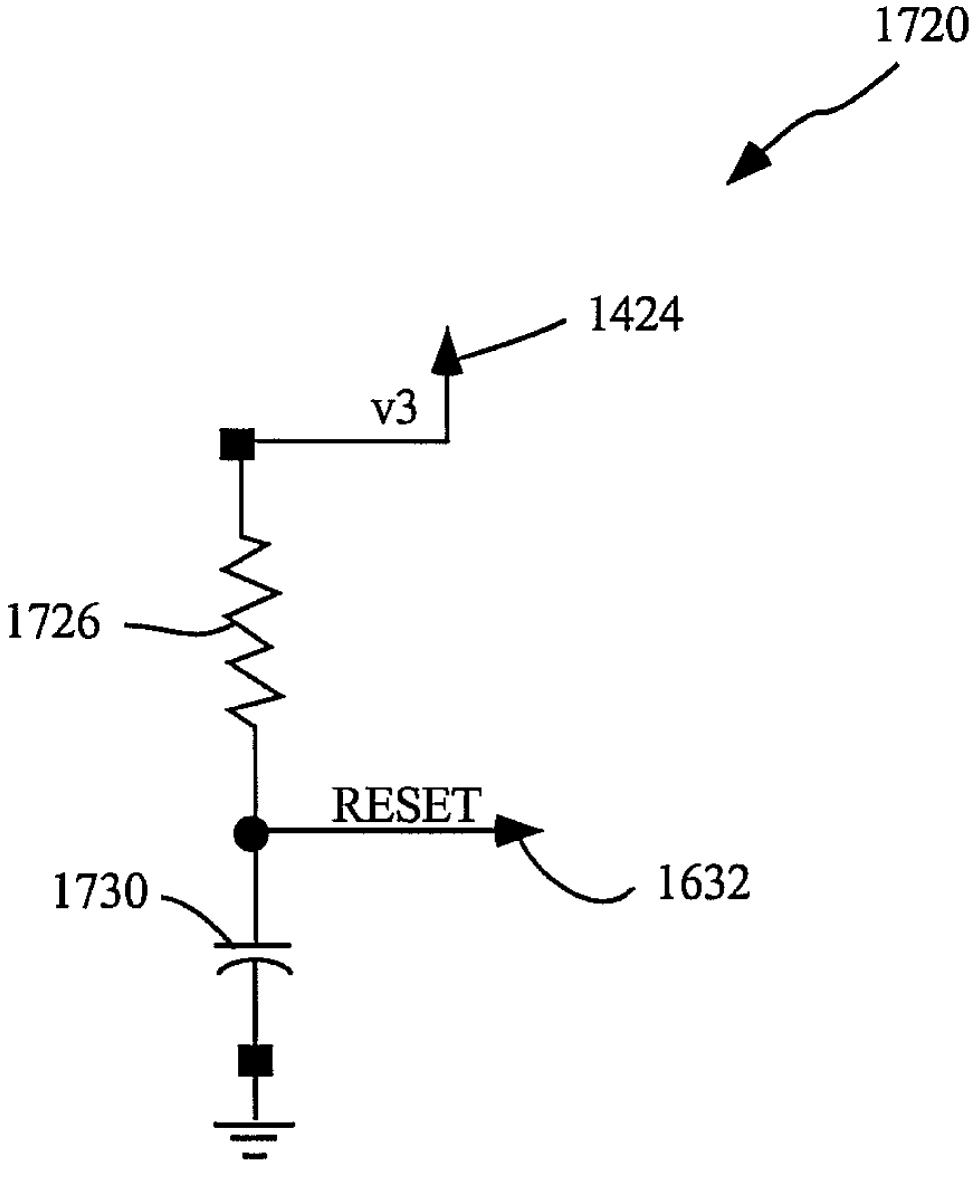
FIG. 17 depicts a simplified schematic diagram of a reset circuitry that can be employed to maintain a reset signal for a desired period of time.

FIG. 16 shows a simplified schematic pin layout for a connector 1620 to the communication module 240 according to some embodiments allowing communication between the controller 222 and the communication module 240, for example, based on the RS-232 interface standard. This communication can be implemented, for example, at about 115200 bps. As described above, the voltage adjustment circuit 242 can couple with this connector to establish communication with the communication module. The connector 1620 includes a receive communication pin 1624 that couples with the communication receive line 464 of the down-voltage voltage adjustment circuitry 422 (see FIG. 4) and similarly includes a transmit communication pin 1626 that couples with the communication transmission line 466 of the voltage adjustment circuitry. A reference voltage pin 1630 can further be included that can couple with the reference voltage 1424 of the 3V voltage regulator circuitry 1420. A reset pin 1632 can additionally be included that instructs the communication module to reset. In some implementations it can be beneficial to bias this reset pin and/or maintain a reset signal for a period of time. FIG. 17 depicts a simplified schematic diagram of a reset circuitry 1720 that can be employed to maintain and/or extend a duration of a reset signal for a desired period of time. For example, with some Bluetooth modules it can be beneficial to maintain a high reset signal for at least 5 ms, for example, on start-up. The reset circuitry 1720 outputs the reset signal 1724 from between a resistor 1726 and capacitor 1730 with the resistor coupled to a reference voltage (e.g., reference voltage 1424) and the capacitor couples with ground. The reset pin 1632 receives a full voltage at startup and then decays. The resistor-capacitor network of the reset circuitry 1720 can help to maintain a high voltage for a longer period of time. In some implementations, the resistor 1726 can be about 1 MΩ and the capacitor can be about 0.1 μF.

Figure 18:
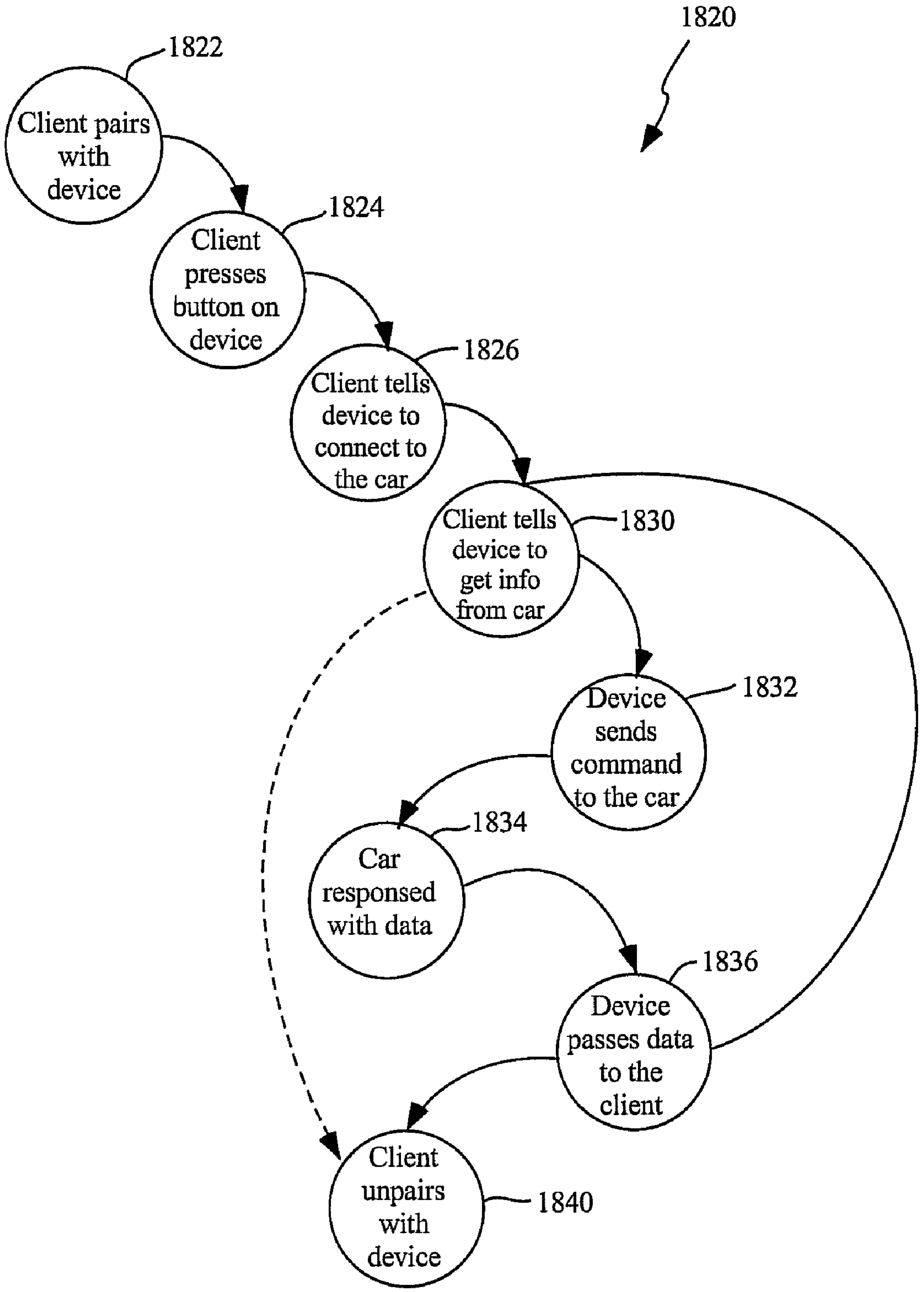
FIG. 18 depicts a simplified flow diagram of a process in transferring communications between a user device and an ECU of an automobile or other relevant device.

FIG. 18 depicts a simplified flow diagram of a process 1820 in transferring communications between a user device 126 and an ECU 124 of an automobile or other relevant device. In step 1822, user device 126 initiates a communication with an ECU interface system 122. The initiation between the user device and the ECU interface system can include pairing the user device with the ECU interface system. This pairing can include identifying the user device and/or a user device identification, identifying a communication protocol, establishing other communication parameters and/or providing an authentication or authorization to pair with the ECU interface system. The authorization can include forwarding an access code (e.g., a predefined limited number of digits code, such as a four digit numerical code or a code designated by the user). The access code can be forwarded upon initial request for pairing and/or in response to a request from the ECU interface system. In some instances the access code is associated with the ECU, such as generated by the ECU, based on an identification number of the ECU and/or other such associate. In pairing the access code can be confirmed by the ECU. Further, the pairing may be similar or substantially the same pairing as employed in communicating between two wireless Bluetooth capable devices. In some instances the Bluetooth devices generate a secure connection through the initial pairing process where one or both devices use an access or Personal Identification Number (PIN) code that is entered, which is used by internal algorithms to generate a secure key, which is then used to authenticate the devices when connect.

The process 1820 can further optionally include step 1824 that provides addition security by preventing communication with the ECU 124 until a user triggers an activation button 236. Typically, the activation button is physically coupled with the ECU interface system 122 and as such provides some protection from unauthorized access to an ECU. For example, in some implementations as introduced above, the ECU interface system 122 has relatively small dimensions, in part by employing IC devices to establish a desired small size, that allow the ECU interface system to be mounted within an automobile and coupled with the ECU (e.g., through a in-dash board, under-dash board or other such ECU connector). As such, an unauthorized user could not gain access to the ECU without being able access the interior of the automobile.

Upon detection of the selection of the activation button in step 1824, the process continues to step 1826 where the ECU interface system 122 establishes a communication link between the user device 126 and the ECU 124. This establishment of the communication link can be in response to a command from the user device and/or in response to the pairing, authentication and/or pressing of the activation button. In some implementations the pairing is limit to a predefined duration of time following the activation of the button 236. For example, the pairing has to be started and/or completed within one minute of pressing the button. In step 1830, a communication, such as a command, is received from the user device that is to be forwarded to and performed by the ECU. In step 1832, the ECU interface system forwards the communication and/or command to the ECU. In step 1834, the ECU interface system receives a response from the ECU to the communication and/or command. The pairing in some embodiments activates a Bluetooth device within range of the installed Bluetooth module to set up a communication link. Security and/or the safety of the driver may be compromised, however, if outside devices were permitted to access an automobile's ECU, where such a connection, for example, could potentially be used to turn off an automobile's engine remotely while in operation. Some embodiments employ a kind of firewall or security barrier in setting up a paired connection between the ECU interface system (and/or the ECU) and the user device that received signals from the ECU interface system. An example of this security is the use of the optional pairing activation button 236 that when activated opens a predefined window of time to allow a user device to initiate and/or achieve the pairing with the ECU interface system. In some implementations, the Bluetooth module can freely send signals from the user device to the controller 222, but the controller does not respond until the button is pushed and/or pairing has been established.

Still referring to FIG. 18, upon receipt of the response, step 1836 is entered where the ECU interface system forwards the response to the user device, so the user device, for example, can print and/or display the response. The process 1820 then returns to step 1830 to receive further communications/commands from the user device for the ECU. Alternatively, the ECU interface system can terminate the communication link with the user device by unpairing with the user device. In some instances, the communication received in step 1830 can be instructions to terminate the pairing skipping to step 1840.

As described above, the ECU interface system 122 typically formats, translates and/or converts the communications and/or commands from the user device 126 into a desired protocol that can be accurately interpreted by the ECU 124. This protocol conversion can occur in step 1832. Similarly, the ECU interface system 122 receives communications from the ECU in the protocol and translates the communication from the protocol to a format that is readily received and utilized by the user device 126.

Figure 19:
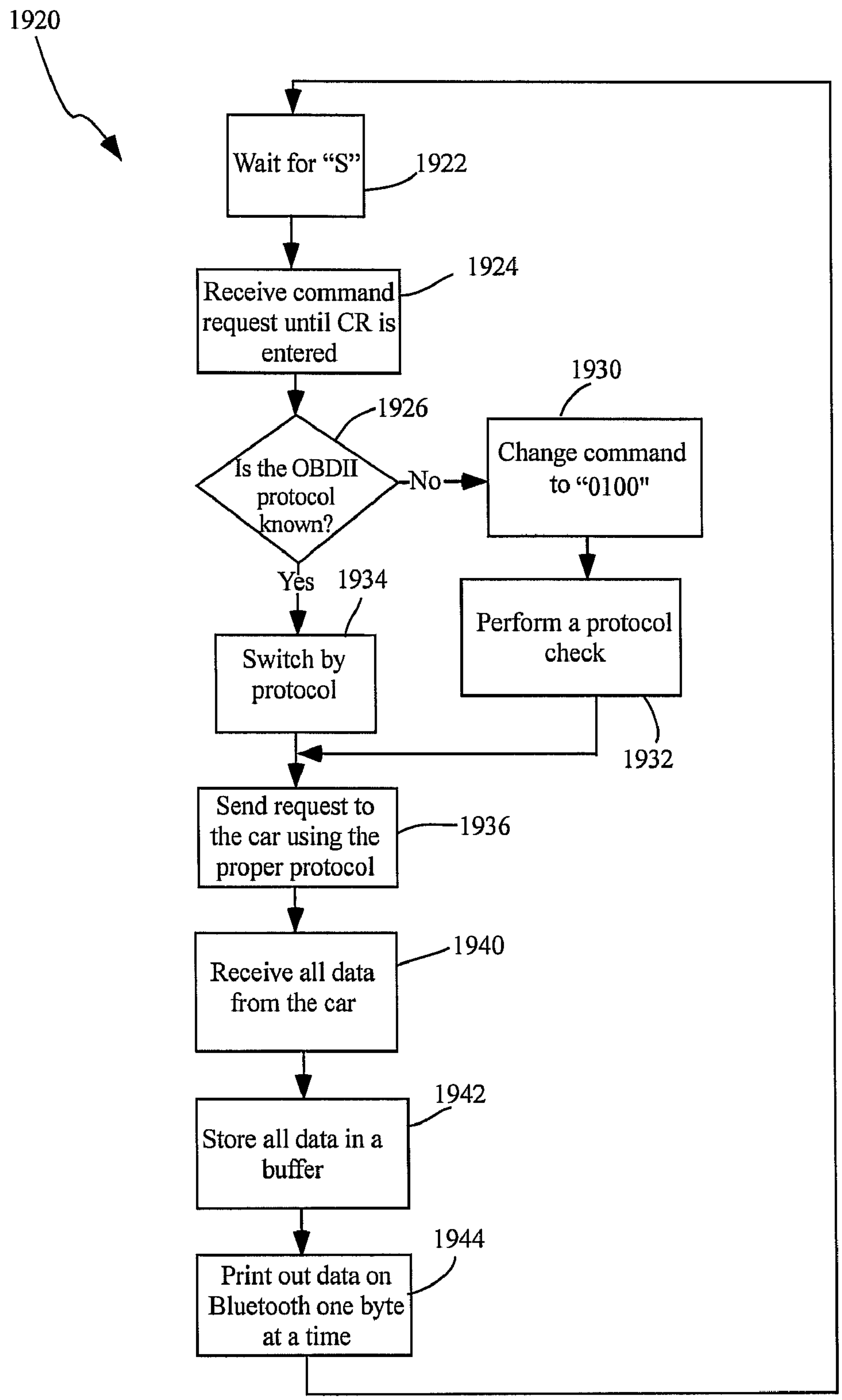
FIG. 19 shows a simplified flow diagram of a process of implementing one or more steps of the process of FIG. 18 according to some embodiments.

FIG. 19 shows a simplified flow diagram of a process 1920 of implementing one or more steps of the process 1820 of FIG. 18 according to some embodiments. In step 1922, the process determines whether a communication initiation command or other relevant predefined command is received. In some implementations the communication initiation command is a predefined sequence of bits, a predefined character and/or other identifier. For example, the process can wait until a "$" command is received. In some instances, this predefined command is generated by the user device in response to a user requesting to initiate communication. Once the predefined command is received step 1924 is entered where a request and/or command to be forwarded to the ECU 124 is received. This step can be configured to wait until a predefined number of bits, bytes or other relevant amount of information is received indicating a complete request or command has been received. Additionally or alternatively, step 1924 continues to wait until a carriage return or other indication (e.g., a known sequence of bits or the like) that the request or command is received. In step 1926 it is determined whether the protocol (e.g., the OBDII protocol) that the ECU is using is known.

When the protocol is not known, step 1930 is entered where a command is generated to initiate a protocol search. In step 1932, a protocol check is performed in an attempt to identify one or more protocols compatible with the ECU and an appropriate protocol is selected. Alternatively, when the protocol is known in step 1926, the process continues to step 1934 where the appropriate protocol is selected and/or confirmed. In step 1936 the request or command is sent to the ECU 124 using the proper protocol. In step 1940, the process waits until a complete reply is received from the ECU. Again, the determination of a complete reply can be determined based on one or more factors such as a predefined number and/or sequence of bits, carriage return and/or other indications.

In step 1942 the data of the received reply is stored. Typically, the data is stored in a buffer, multi-dimensional buffer, register or other relevant memory. In step 1944, the reply data is formatted for the communication module 240 and forwarded to the communication module for transferring to the user device. For example, when the communication module is a Bluetooth module, the data of the response can be forwarded one or more bytes at a time to be wirelessly transmitted to the Bluetooth enabled user device 126.

Figure 20:
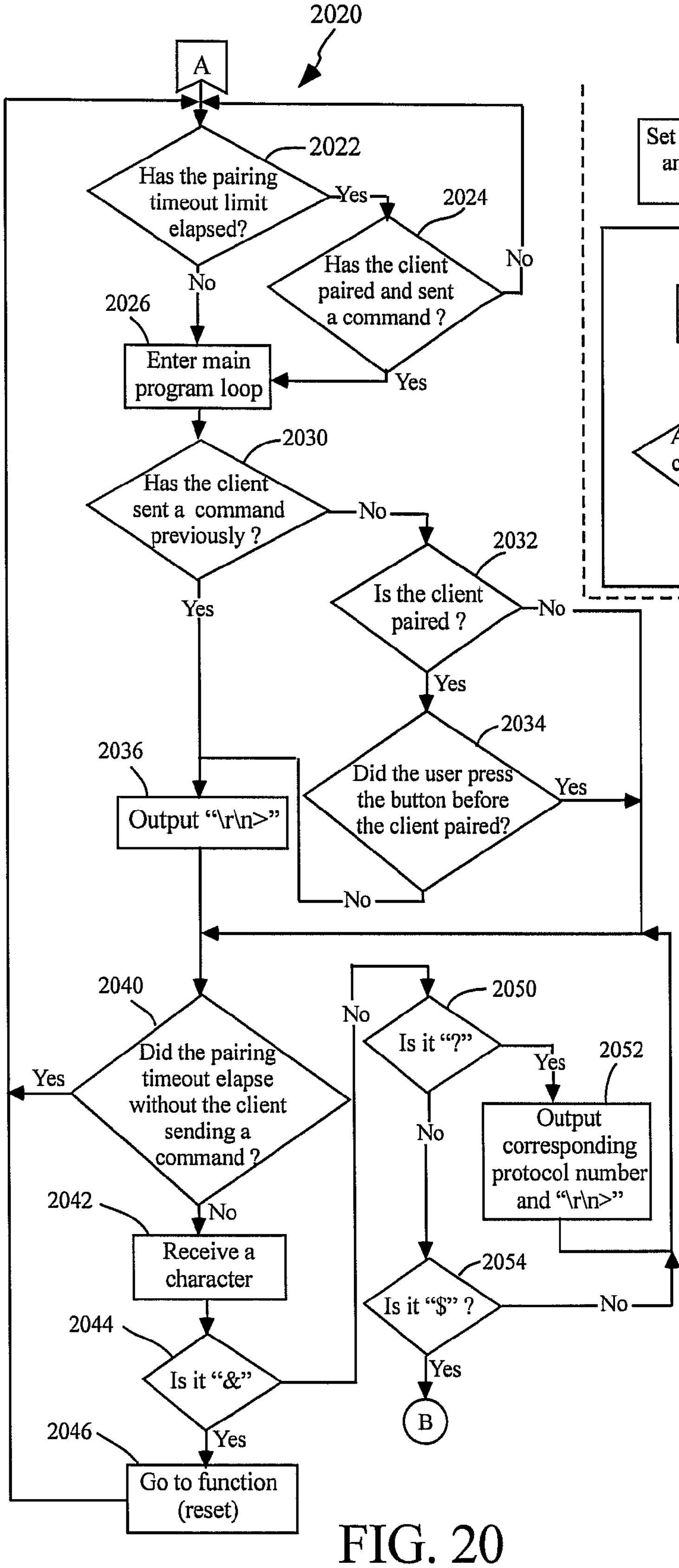
FIGS. 20-23 depict further detailed flow diagrams of processes that can be used in implementing one or more steps of the processes of FIGS. 18 and 19.
Figure 21:
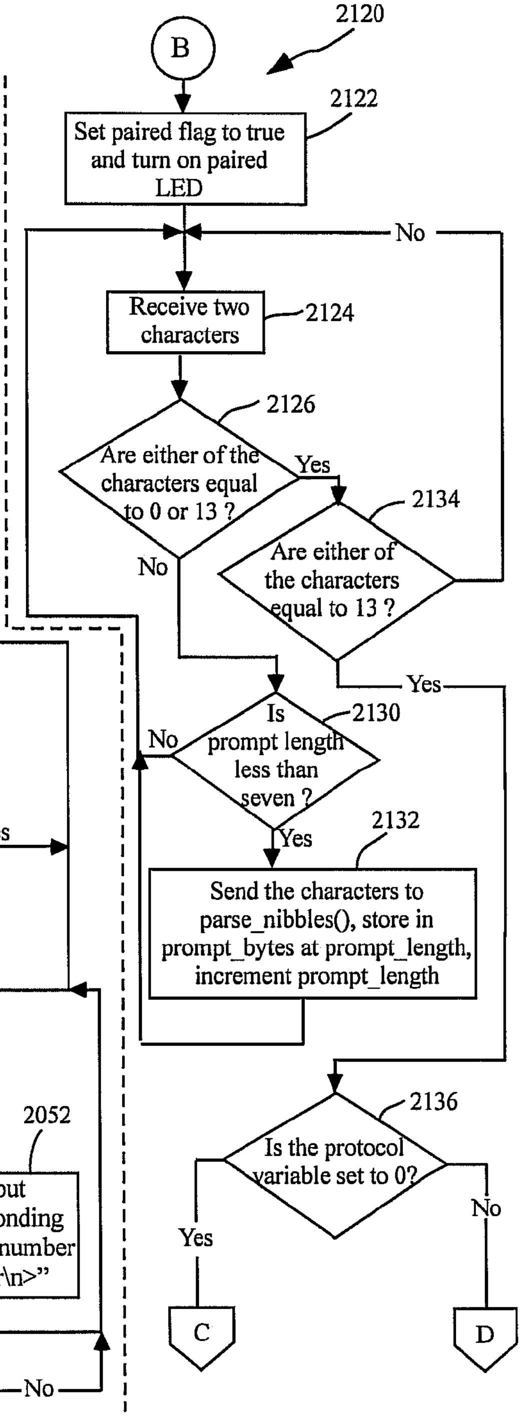

FIGS. 20-23 depict further detailed flow diagrams of processes 2020, 2120, 2220, 2320, respectively, of implementing one or more steps of the processes 1820 and/or 1920 of FIGS. 18 and 19, respectively. Referring to FIG. 21, at step 2022 in implementing the pairing between the user device 126 and the ECU interface system 122 it is determined whether threshold pairing time period has elapsed. In some instances, a timer is activated upon an initial request to pair and/or upon pressing the activation button 236. When the pairing time threshold has not elapsed the process continues to step 2026. This pairing threshold time period can provide added security to the ECU interface system. By limiting an ability of user devices to pair with the ECU interface system 122 and/or ECU 124 by a window of time, unauthorized access can be significantly reduced. For example, the pairing threshold period can be defined as 2 minutes, 1 minute or other relevant time periods from the time the activation button 236 is press to limit when a user device can pair with the ECU interface system. Alternatively, when the pairing time threshold has elapsed step 2024 is entered where it is further determined whether the user device 126 was paired with the ECU interface system 122 and whether a command was sent by the user device while paired.

In step 2026, the process enters a main processing or programming loop. In step 2030 it is determined whether a command, request or other relevant communication was previously received from the user device. When it is determined that a command was not received from the user device step 2032 is entered where it is determined whether the user device is paired with the ECU interface system 122. In instances where the user device is paired the process may continue to optional step 2034 to determine whether the activation button 236 was pressed prior to pairing. Step 2036 is entered when it is determined in step 2030 that a command was received from the user device or when it is determined in step 2034 that the activation button was not pressed prior to pairing. In step 2036 the ECU interface system 122 outputs a confirmation communication to the user device, such as a return and/or new line commands that can be printed and/or displayed by the user device.

In step 2040 it is determined whether the pairing time threshold elapsed or expired prior to a command, request or other relevant communication being received from the user device 126. When the pairing time threshold has elapsed the process returns to step 2022 and/or terminates. Alternatively, the process continues to step 2042 where a communication is received. In step 2044 it is determined whether the communication is a function command or second predefined request or command. The second predefined request or command can be a predefined sequence of bits, a predefined character and/or other identifier(s). For example, the process can determine whether a "&" command is received. In some instances, this second predefined command is generated by the user device in response to a user request, such as a command sent by the user device when the user requests to close the communication with the ECU interface system 122. Further in some instances, when the second predefined command is detected the ECU interface system to take predefined actions or implement certain functions in step 2046, such as causing the controller 222 to reset itself and disable communication with the ECU 124. The process can then terminate and/or return to step 2022.

When it is determined in step 2044 that the command is not the second predefined command, step 2050 is entered to determine whether the communication is and/or includes a third predefined command or request. Similar to the second predefined command, the third predefined command can be a predefined sequence of bits, a predefined character and/or other identifier(s). For example, the process can determine whether a "?" command is received. In some instances, this third predefined command is generated by the user device 126 in response to a user device and/or user querying the ECU interface system 122 to identify and/or determine which protocol is being used by the ECU 124. When the third predefined command is received step 2052 is entered where the ECU interface system identifies the protocol and returns an indication of the protocol. In some instances, as described below, the ECU interface system can return a number value corresponding to one of a plurality of protocols. The process then returns to step 2040.

Alternatively, when the communication does not include the third predefined command, step 2054 is entered to determine whether the communication includes and/or is the communication initiation command (e.g., "$" command). When the communication is not the communication initiation command the process returns to step 2040. Alternatively, the process 2020 continues to the process 2120 of FIG. 21.

Referring to FIG. 21, in step 2122 a pairing flag or other indication is set indicating that a pairing with the user device has been established. In some instances, an LED or other indicator is activated acknowledging the pairing. In step 2124, a predefined number of characters are received from the user device, such as a two characters. In step 2126 it is determined whether the received characters include a null character (e.g., "0" character) or an end of command/request (or completed send) character such as a carriage return character (e.g., "13" character, where 13 represents 0x0D in hexadecimals, which typically defines a carriage return). When neither of the characters is the null or end of command character step 2130 is entered to determine whether a number of stored command bytes is less than a threshold limit (e.g., less than 20, less 7 or less than another relevant limit). When the number of command bytes is less than the threshold the process continues to step 2132 where the characters received in step 2124 are stored and the number of stored command bytes is incremented. In some implementations, the controller 222 receives two ASCII characters and converts them into a single byte representing those two characters (e.g., in some instances a parse-nibbles( ) program is activated to implement the conversion). Certain characters are represented in ASCII by two characters and are converted into a single byte in order to be communicated with the controller. The characters in the byte form can be stored during step 2132 in an array (e.g., a "prompt_bytes" array) that stores the valid command bytes, and where a "prompt_length" parameter is incremented in step 2132 to track the number of command bytes that are stored and used in step 2130. Together the prompt_bytes array and prompt_length parameter can make up a counter and a buffer. Typically the array and/or buffer is part of the controller 222; however, they can be external to the controller. Additionally, some embodiments can further include one or more timers that can be used, in part, to identify one or more timeout periods at the end of the message, such as following steps 2130 and/or 2132 so that the controller does not hang waiting for the next bit that may never come.

Still referring to FIG. 21, when it is determined in step 2126 that one of the received characters is a null or end of command character the process 2120 alternatively continues to step 2134 to determine whether either of the characters is the end of command character. When neither of the characters are the end of command character the process returns to step 2124. The lack of the end of command character indicates that there is no valid command byte from the user device, nor is it a byte that indicates termination (as with the end of command character, e.g., "13"). In some instances, the null character (e.g., "0" character) directs the process to continue the loop sequence.

When it is determined in step 2134 that one of the characters is the end of command character the step 2136 is entered to determine whether the protocol for communicating with the ECU is known. For example, a numerical value can be used to represent the plurality of available protocols and an additional value (e.g., a zero (0) protocol value) can define that the protocol is unknown. When the protocol is unknown (e.g., the protocol value is set to a "0") the process 2120 continues to process 2220 of FIG. 22. Alternatively, when the protocol is known, the process continues to process 2320 of FIG. 23.

Figure 22:
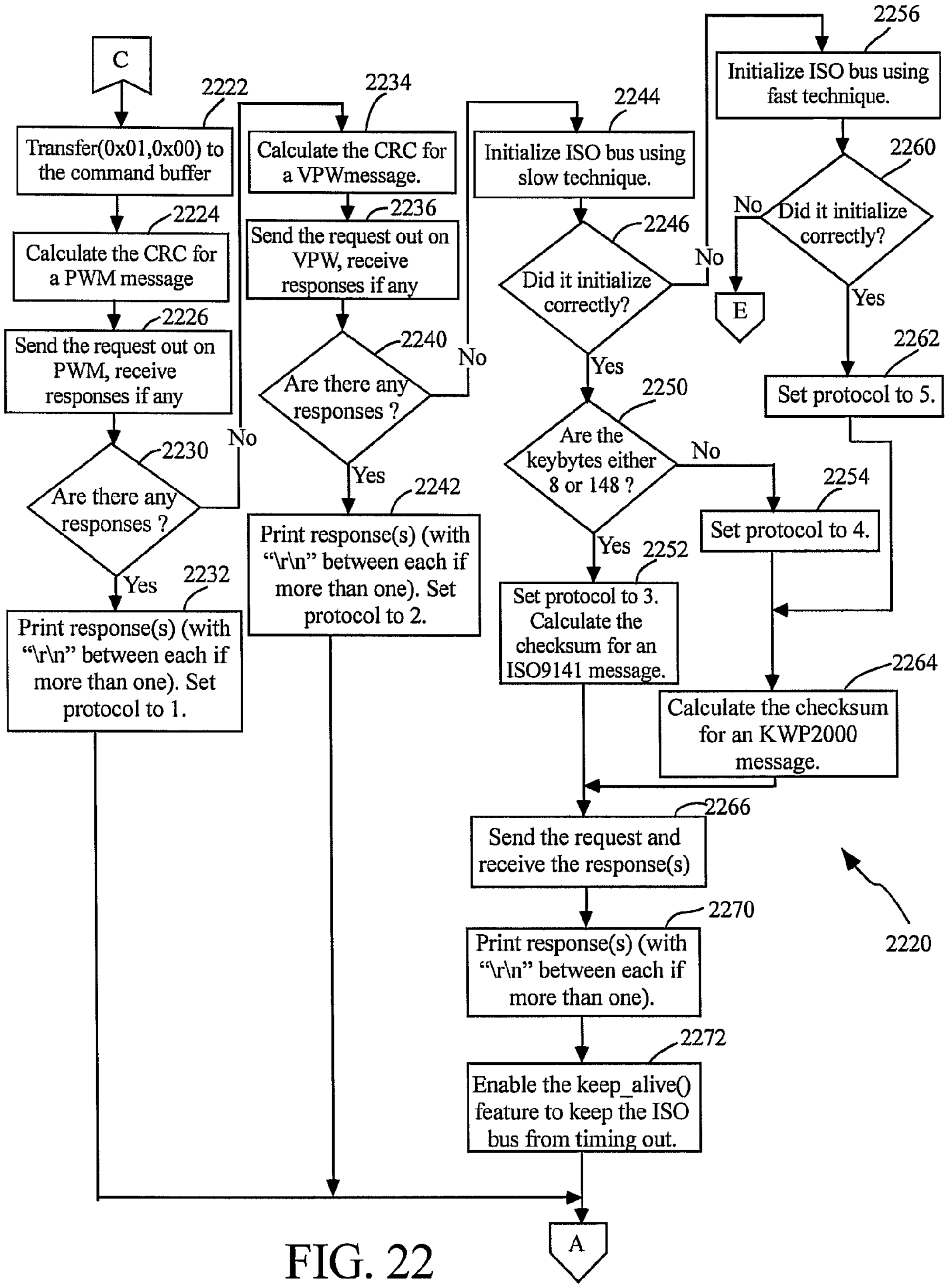

Referring to FIG. 22, in step 2222 a command is formatted (e.g., a {0x01, 0x00} command) and forwarded to a command buffer of the controller 222. In step 2224, a Cyclic Redundancy Check (CRC), checksum or other relevant corruption detect scheme is generated for a first protocol (e.g., the PWM protocol). In step 2226 a request and/or command is transferred to the ECU 124 and a reply from the ECU is received if a reply is communicated. In step 2230 it is determined whether a reply from the ECU was received. When a reply is received step 2232 is entered where the protocol to communicate with the ECU 124 is confirmed as the first protocol (e.g., PWM protocol) and a protocol indicator is set (e.g., a protocol value can be set to a "1" value indicating the PWM protocol) noting and/or registering the protocol, and the process 2220 returns to the process 2020 of FIG. 20. In some embodiments, the use of the protocol value or flag, or similar flag can be used as an interrupt to simplify protocol routines and allow the protocol routines to be at least partially distinct. For example, when the protocol is a PWM the PWM protocol flag can trigger an interrupt and direct the controller 222 to execute the relevant PWM code; else when the protocol is VPW, interrupt and execute the relevant VPW code; else when the protocol is ISO 9141-2, interrupt and execute the relevant ISO 9141-2 code, etc.

Still referring to FIG. 22, when it is determined in step 2230 that a reply is not received, the process continues to step 2234 where a CRC is calculated for a second protocol message (e.g., for the VPW protocol). In step 2236 a second protocol request and/or command is transferred to the ECU 124 and a reply from the ECU is received when a reply is communicated. In step 2240 it is determined whether a reply from the ECU was received. When a reply is received step 2242 is entered where the protocol to communicate with the ECU 124 is confirmed as the second protocol (e.g., VPW) and a protocol indicator is set (e.g., a protocol value can be set to a "2" value indicating the VPW protocol), and the process 2220 returns to the process 2020 of FIG. 20. In some embodiments, a Capture-Compare PWM (CCP) module of the PIC18F2580 is used to capture the VPW characteristics when decoding. The decoding process utilizes a toggle variable that keeps track of which pulses corresponded to which voltage levels of the J1850 bus. In some instances, the toggle variable can be a simpler implementation. A filter can additionally or alternatively be utilized with one or both of the VPW and PWM processing to limit the storage of messages to those messages that contained a predefined or specific header or one of a plurality of predefined header(s).

When it is determined in step 2240 that a reply is not received, the process continues to step 2244 where the ISO bus is initialized using slow techniques as is known in the art. In step 2246, the process determines whether the ISO bus initialized properly. When the ISO bus is initialized properly step 2250 is entered to determine whether the two keybytes from the ECU are equal to 08 hexadecimal or 94 hexadecimal. When the two keybytes are determined to be 08 or 94 hex, step 2252 is entered where the protocol is confirmed as a third protocol (e.g., ISO9141), the protocol indicator is set (e.g., a protocol value can be set to a "3" value indicating the ISO9141 protocol), and a checksum is calculated for a message for the third protocol. Alternatively, when 8 keybytes are not used, step 2254 is entered where the protocol is confirmed as a fourth protocol (e.g., the KWP 2000-slow protocol) and the protocol indicator is set (e.g., a protocol value can be set to a "4" value indicating the KWP 2000-slow protocol).

Referring back to step 2246, when it is determined that the ISO bus failed to initialize properly the process skips to step 2256 where the ISO bus is initialized using the fast technique as is known in the art. In step 2260 it is determined whether the ISO bus initialized properly. When the ISO bus fails to initialize properly, the process 2220 continues to step 2340 of the process 2320 of FIG. 23. Alternatively, step 2262 is entered where the protocol is confirmed as a fifth protocol (e.g., KWP 2000-fast protocol) and the protocol indicator is set (e.g., a protocol value can be set to a "5" value indicating the KWP 2000-fast protocol).

Following steps 2254 and 2262 the process continues to step 2264 where a checksum is calculated for a message for a KWP 2000 protocol. Step 2266 is entered following step 2252 or step 2264 and a request or command is forwarded to the ECU according to the appropriately identified protocol, and a reply is received when a reply is sent. In step 2270, the reply is configured to be forwarded to the communication module and transmitted to the user device. In some instances, the communication is formatted, for example, with carriage return (e.g., "\r") and/or a new line command (e.g., "\n") between each reply when more than one reply is received from the ECU and/or forwarded to the user device. In step 2272 a command is issued by the controller 222 to maintain the ISO bus active. For example, a keep_alive( ) function can be activated that keeps the ISO bus from timing out. Following step 2272 the process 2220 returns to the process 2020 of FIG. 20.

Figure 23:
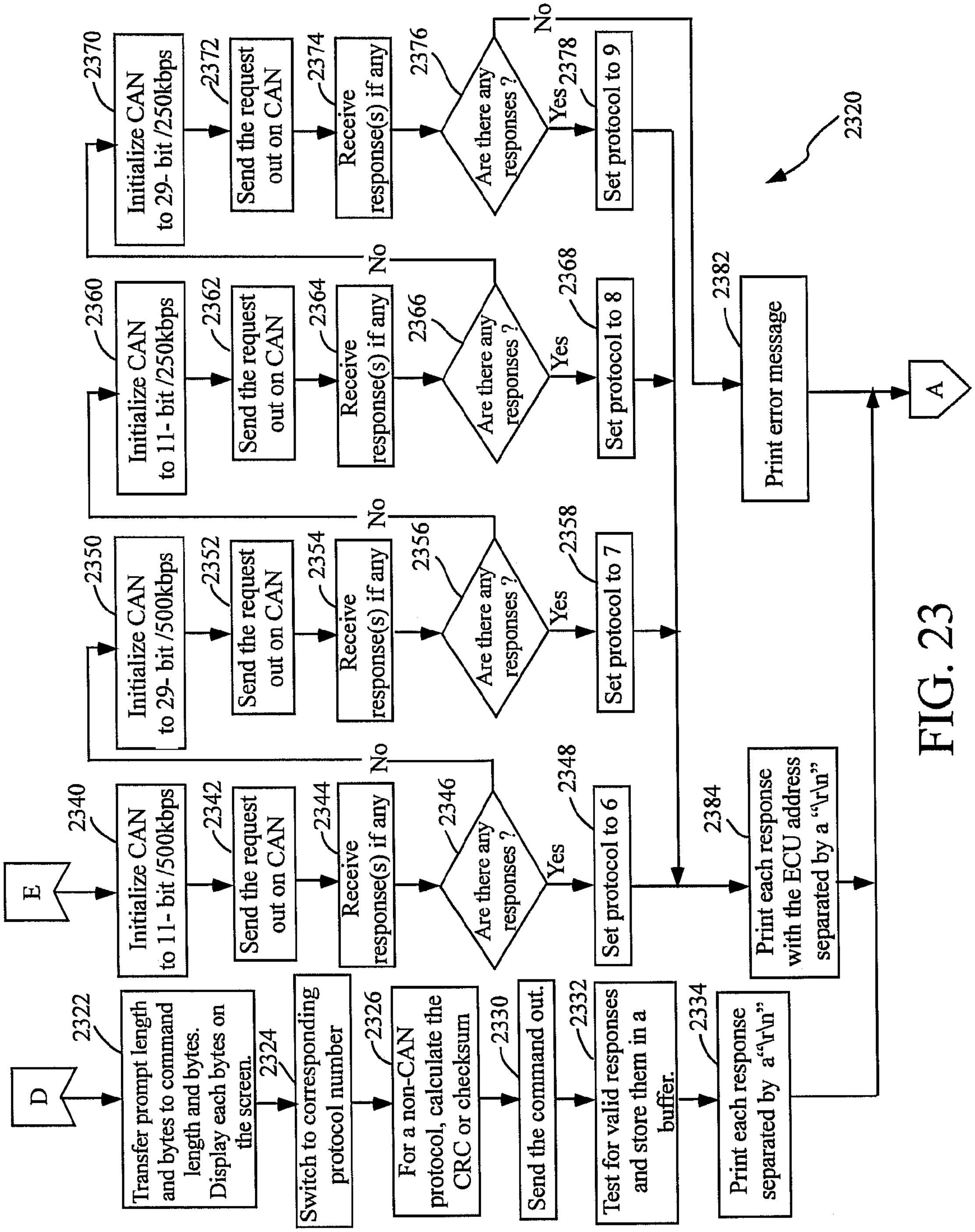

Referring to FIG. 23, when it is determined in step 2136 that the protocol for communicating with the ECU is known, step 322 of the process 2320 is entered where the number of stored command bytes (e.g., the prompt_length parameter) and bytes are transferred to command lengths and bytes to be displayed. In step 2324, the known protocol is selected and the protocol indicator is set to an appropriate value. In step 2326, one or more CRC and/or checksums are calculated for non-CAN protocols. In step 2330 commands are forwarded to the ECU 124 using the known protocol. In step 2332, responses are received when valid responses are transmitted from the ECU and the responses are buffered. In step 2334, the responses are formatted to be transferred to the communication module 240 and transmitted to the user device so that the responses can be printed and/or displayed. In some embodiments, the communication is formatted, for example, with a carriage return (e.g., "\r") and/or a new line command (e.g., "\n") between each response when more than one response is received from the ECU and/or forwarded to the user device.

Still referring to FIG. 23, when it is determined in step 2260 of the process 2220 of FIG. 22 that the ISO bus failed to initialize properly using the fast technique, step 2340 of the process 2320 is entered where a sixth protocol is selected (e.g., a CAN 11 bit/500 kbps protocol) and the command/request is initialized according to the sixth protocol. In step 2342 the command is forwarded out on the CAN lines to the ECU 124. In step 2344, one or more responses from the ECU are received when the ECU returns responses. In step 2346 it is determined whether a response was received. When a response was received the process continues to step 2348 where the protocol is confirmed as the sixth protocol (e.g., CAN 11 bit/500 kbps) and the protocol indicator is set (e.g., a protocol value can be set to a "6").

The process continues to step 2350 when it is determined in step 2346 that a response was not received. In step 2350 a seventh protocol is selected (e.g., a CAN 29 bit/500 kbps protocol) and the command/request is initialized according to the seventh protocol. In step 2352 the command is forwarded out to the ECU 124. In step 2354, one or more responses from the ECU are received when the ECU returns responses. In step 2356 it is determined whether a response was received. When a response was received the process continues to step 2358 where the protocol is confirmed as the seventh protocol (e.g., CAN 29 bit/500 kbps) and the protocol indicator is set (e.g., a protocol value can be set to a "7").

When it is determined in step 2356 that a response was not received, the process continues to step 2360 where an eighth protocol is selected (e.g., a CAN 11 bit/250 kbps protocol) and the command/request is initialized according to the eighth protocol. In step 2362 the command is forwarded out to the ECU 124. In step 2364, one or more responses from the ECU are received when the ECU returns responses. In step 2366 it is determined whether a response was received. When a response was received the process continues to step 2368 where the protocol is confirmed as the eighth protocol (e.g., CAN 11 bit/250 kbps) and the protocol indicator is set (e.g., a protocol value can be set to an "8").

Alternatively, when it is determined in step 2366 that a response was not received, the process continues to step 2370 where a ninth protocol is selected (e.g., a CAN 29 bit/250 kbps protocol) and the command/request is initialized according to the eighth protocol. In step 2372 the command is forwarded out to the ECU 124. In step 2374, one or more responses from the ECU are received when the ECU returns responses. In step 2376 it is determined whether a response was received. When it is determined that a response is not received and error message is generated and forwarded to the user device in step 2382. When a response was received the process continues to step 2378 where the protocol is confirmed as the ninth protocol (e.g., CAN 29 bit/250 kbps) and the protocol indicator is set (e.g., a protocol value can be set to a "9").

Still referring to FIG. 23, following steps 2348, 2358, 2368 and 2378, step 2384 is entered where the responses are formatted to be transferred to the communication module 240 and transmitted to the user device so that the responses can be printed and/or displayed, and the process 2320 returns to the process 2020 of FIG. 20. In some embodiments, the communication is formatted, for example, with a carriage return (e.g., "\r") and/or a new line command (e.g., "\n") between each response when more than one response is received from the ECU and/or forwarded to the user device. More or fewer protocols can be identified depending on the ECU 124.

In monitoring and/or detecting communications from the ECU 124, some embodiments track logic level transitions (e.g., rising and/or falling edges) of the received signals to determine bit information. For example, the VPW protocol specifications indicate that one (1) bit and zero (0) bit information is defined by modulating the signal to have relatively long pulses (e.g., durations of 128 μs) and relatively short pulses (e.g., durations of 64 μs) to distinguish between the bit types. It was determined, however, that the actual pulse widths of signals can vary widely and still meet specification standards such that short pulses can have durations between 48-96 μs, while long pulses could have durations between 96-148 μS making it difficult to distinguish between pulses.

Figure 24:
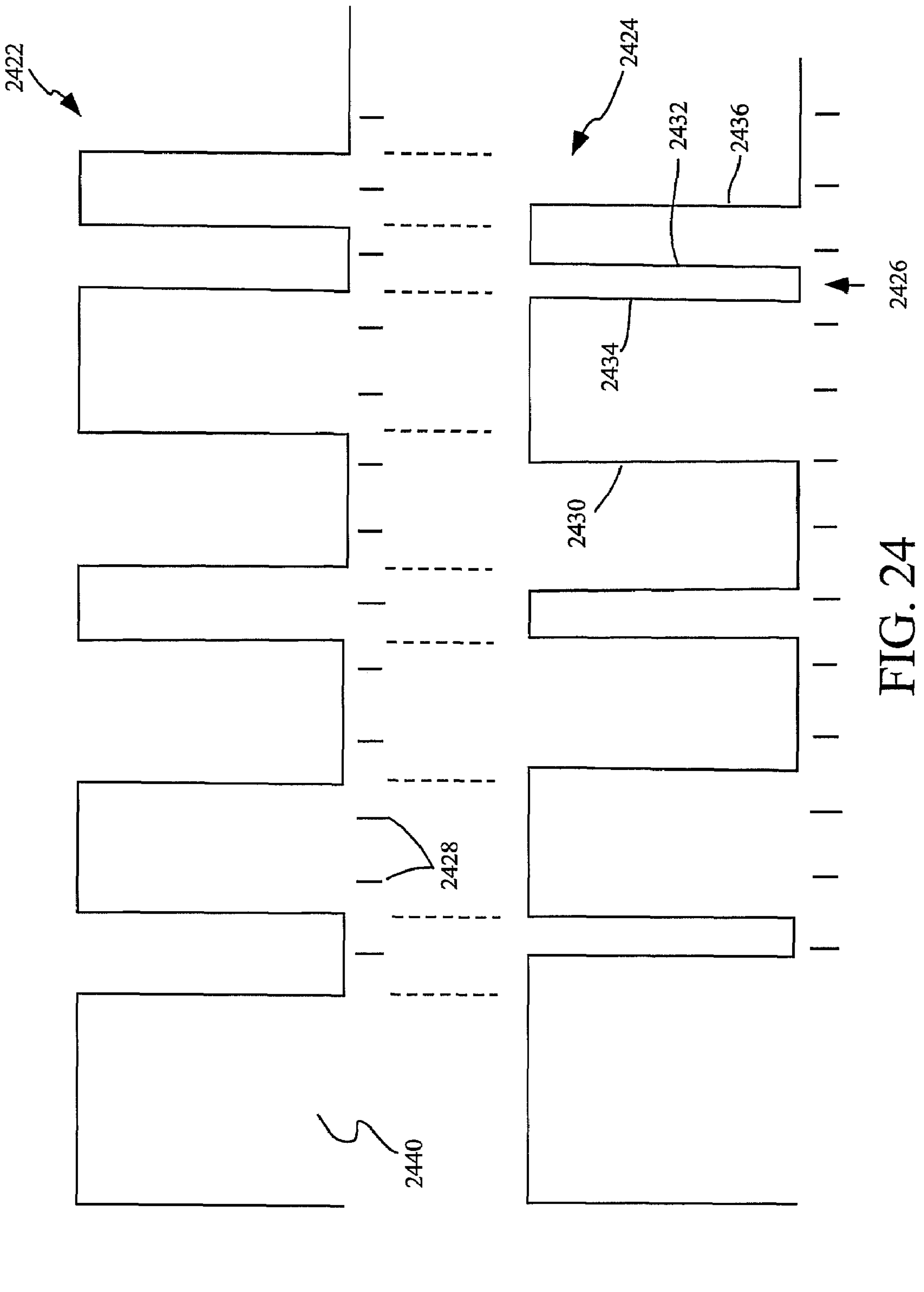
FIG. 24 depicts a simplified graphical representation of a theoretical VPW data signal and a hypothetical example of an actual VPW data signal.

FIG. 24 depicts a simplified graphical representation of a theoretical VPW data signal 2422 and an example of an actual VPW data signal 2424. When the VPW signal received was ideal or substantially ideal, the wave 2422 could be sampled 2428, for example, at a 32 μS offset near a middle of the pulse allowing accurate detection of the pulse durations. In attempting to sample the actual signal 2424 with the same 32 μs offset, one or more pulses can be missed, such as the forth low pulse 2426.

In some embodiments, however, when decoding a VPW signal the rising edges (e.g., rising edges 2430 and 2432) and falling edges (e.g., falling edges 2434 and 2436) are detected. A time is noted or recorded for each rising and falling edge and a time difference can be determined between corresponding rising and falling edges (e.g., 2430 and 2434, and 2432 and 2436). Based on the calculated time difference a determination can be made whether the pulse represents a long pulse or a short pulse. In some implementations, when the time difference is less than 96 μS the pulse is defined as a short pulse, and when the time difference is greater than 96 μs the pulse is defined as a long pulse. The structure of the VPW signal has a start bit 2440 that is 200 μs in duration allowing the system to accurately identify the start pulse and coordinate the rising and falling edges. By detecting the rising and falling edges some embodiments can accurately decode the VPW signal.

Attempting to distinguish between one (1) and zero (0) bits for PWM signals can also introduce errors. In a theoretical PWM signal, data bits are defined during 24 μs periods that are defined by three 8 μS sections. The first 8 μs section is high and the last 8 μs section is low. The center 8 μs section effectively determines the characteristics of the bit such that when center section is high it defines a first type of bit (e.g., a zero (0) bit) and when the center section is low it defines the second type of bit (e.g., a one (1) bit).

Figure 25:
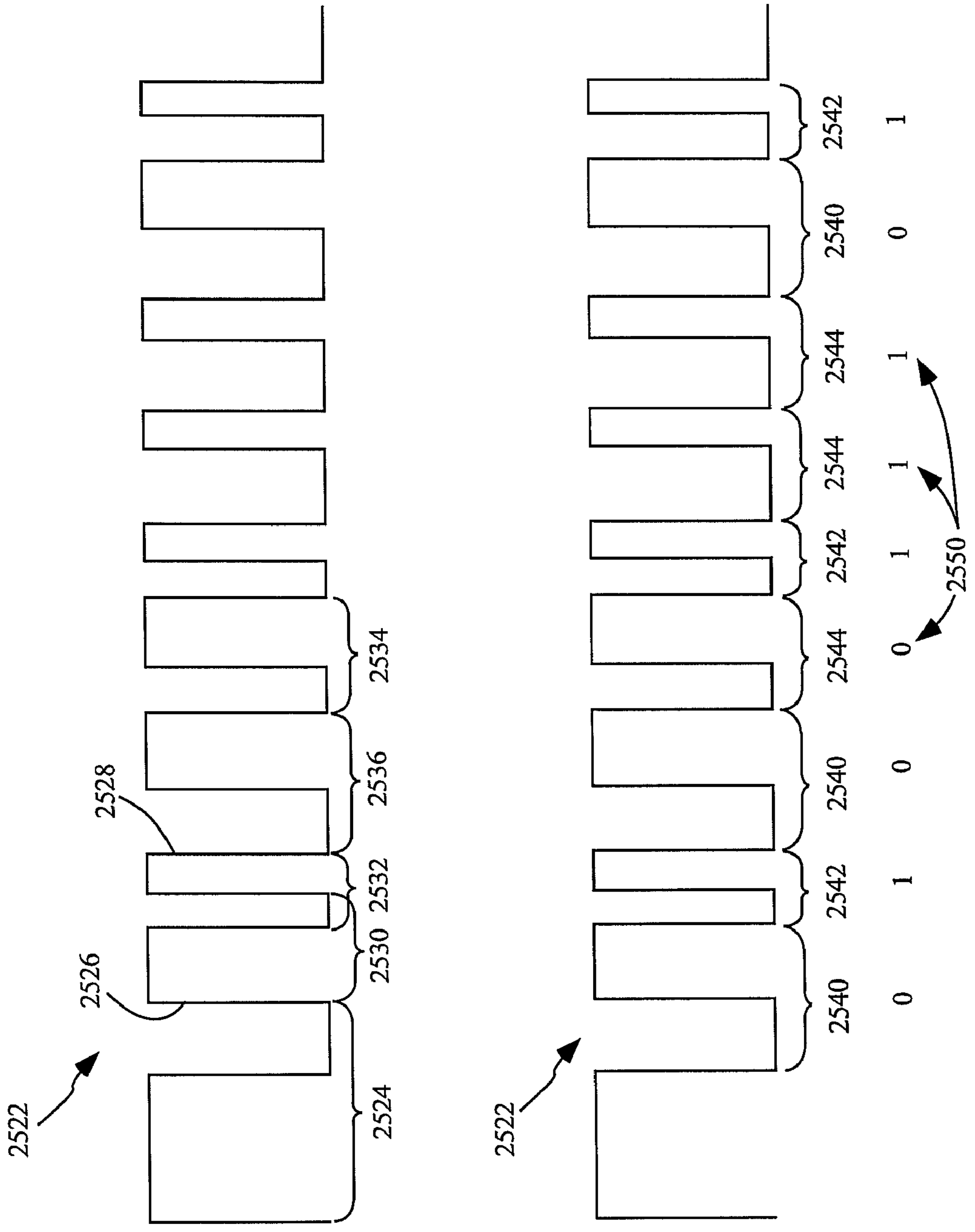
FIG. 25 depicts a simplified graphical representation of a theoretical PWM data signal.

FIG. 25 depicts a simplified graphical representation of a theoretical PWM data signal 2522. A start bit 2524 for PWM signals on the positive differential bus is high for 32 μs and low for 16 μs identifying the start of the signal and allowing for coordination between rising and falling edges and/or detection of each bit of information encoded on the signal. The rising edges 2526 occur 24 μs apart 2630, while the falling edges 2528 can occur at 16 μs, 24 μs and 32 μs apart in time from each other (2532, 2534 and 2536, respectively).

Sampling can be used with the offset at about 12 μs. Sampling at these rates, however, can be difficult and/or more complex circuitry and/or processing would be employed in the ECU interface system to achieve sampling at these rates. Similarly, attempting to detect the rising and falling edges and determining time differences can also be employed. Typically, a relatively high speed processor would be employed to achieve the processing rates to accurately detect the differences in pulses.

Some embodiments, however, reduce the processing requirements and/or sampling rates by detecting each falling edge 2528. A time is noted for each falling edge. A difference is calculated between each falling edge. When the determined difference between two consecutive falling edges is approximately 32 μs (indicated by reference numeral 2540) the PWM signal is defining a first bit type (e.g., a zero (0) bit). Similarly, when the determined difference between two consecutive falling edges is approximately 16 μs (indicated by reference numeral 2542) the PWM signal is defining a second bit type (e.g., a one (1) bit). Additionally, when the determined difference between two consecutive falling edges is approximately 24 μs (indicated by reference numeral 2544), the bit being defined is undetermined and the bit data corresponding to this time is dependent on the value of the previous bit, such that a bit data having a detected 24 μs duration between falling edges can be equated to previous bit 2550. This provides for accurate decoding of the PWM signal while significantly reducing the processing requirements and/or speed. Some embodiments additionally or alternatively mask the command bytes to obtain one bit at time when outputting a signal on the PWM line. This masking can effectively reduce the number of buffers needed.

As described above, in some embodiments the ECU interface system 122 is implemented with relatively small dimensions and/or profile. Some of these embodiments, in part, make use of integrated circuits and/or surface mount components, such as utilizing integrated circuit microcontrollers for the controller 222 (e.g., PIC18F2580 and/or PIC18F248). Further, the communication module in some is implemented, in some embodiments, through a Bluetooth transceiver chip (e.g., BR-C30 Bluetooth module, ABM-450, -600 Bluetooth modules and/or other chip transceivers (where some Bluetooth modules may support multiple wireless connections)). Achieving the relatively small dimensions allows the ECU interface system to be easily transported and utilized and further can be connected and left connected with a automobile's ECU without interfering with the operation of the automobile.

As described above, some embodiments determine which protocol an ECU uses. It can also dictate that the determination is performed in a particular order. This order can include sending out a specific message using each protocol, one at a time, until a response is received. The non-CAN communication protocols fit into one of two categories: in the first, most of the process is defined, for example based on RS232 serial communication and/or taken care of by documented means. The ISO 9141-2 and KWP 2000 protocols may fall into the first category. Their communication occurs serially by means of an RS 232 connection at, for example, a 10400 baud rate. The programming solution provided in some embodiments for these protocols involved the initialization that prepares the ECU to enter a diagnostic mode. The KWP 2000 slow initialization uses the same or a similar process as the ISO9141-2 protocol, while the KWP 2000 fast initialization is different. In some instances, timing can be managed in part by outputting pins with high and low voltages and using a delay to achieve the correct timing.

Other protocols fall into a secondary category. For example, the PWM and VPW protocols fall into the second category. Typically each message includes a start bit, an active pulse for a specific amount of time as defined in the SAE J1850 standard. For PWM, some embodiments further output the messages one bit at a time, by using a bit mask so the device would look at one bit per byte at a time. The transmission of each bit is effectively defined and/or separated into three parts, where as described above, the first part is high, the last part is low and the second part contains the characteristic of the bit. For example, when the bit is a one (1) bit the line transitions low during the second part, and alternatively when the bit is a zero (0) the line remains high. In some embodiments, a delay is utilized to generate timing. For VPW, the outbound command is converted from bytes to bits. After the start bit, the line oscillates low to high, starting with low and ending high. If the bit is a one (1) and the line was low, the line delays for a relatively long period of time, and when the line is high, the line delays for a relatively short period of time. The opposite can be applied for zero (0) bits such that when the line is low it delays for a relatively short time, and when the line is high it delays for a relatively long time.

When receiving PWM data characteristics of the message can be determined when timing of the falling edges of the signal are captured. The corresponding time of the falling edges can be stored (e.g., in a buffer) and a difference is used to determine the bits. A difference that is relatively short (e.g., around 16 μs) indicates a first type of bit (e.g., a one (1) bit), a difference that is relatively long (e.g., around 32 μs) indicates a second bit type (e.g., a zero (0) bit), and a difference that is about between the short and long periods (e.g., around 24 μs) depends on the prior bit(s). When a prior difference time period is also 24 μs duration the bit value is chained down until a non-24 μs pulse was detected. For example, with pulse times of 16, 16, 24, 32, 16, 32, 24, 24, 16, 24, the corresponding bits would be 1, 1, 1, 0, 1, 0, 0, 0, 1, 1. The third bit gets set to the same value as the second bit. The eighth bit gets set to the seventh bit, which gets set to the sixth bit (that is, the bits are chained). In parsing PWM signals data can in some instances be received too fast. Some embodiments employ a CCP module on and/or cooperated with the controller 222 to capture the rising and falling edges of the signal and store the corresponding time in a buffer. This allows for the calculation of the differences between rise and fall edges to determine bit values.

In detecting VPW signals, a CCP module can be used to capture the rising and falling edges of the pulses. When a rising edge is encountered, the CCP module is switched to look for a falling edge, and when a falling edge is encountered the CCP module is again switched back to look for a rising edge. Time periods between rising and falling edges are determined and a value of about 96 μs is used to distinguish between short and long pulses. Typically, a first pulse of the message is going to be low providing a matching or reference to match the short and long pulses to 1 and 0 bits depending on whether the line was supposed to be high at that time or not. Some embodiments further convert the bits to bytes for both PWM and VPW to allow printing more easily.

The evaluation of the CAN protocols can be considered some what of a hybrid. A CAN module for the controller can be employed to avoid processing information at the bit level. A control structure is provided to deal with the four types of CAN message and respond appropriately.

In some instances, with the protocols set to send data and capable of receiving data, a determination of the protocol is initiated, as described above. In brief, a response request indicates that the protocol responding is the correct protocol to use. Once the proper protocol is known, discovered and/or provided, communication between the ECU interface system 122 and the ECU 124 can occur. These communications typically include gathering one or more commands and/or requests from the user device 126. In some instances, the controller applies a correct header to a communication with the ECU and an appropriate error checking byte, typically, at the end. The ECU interface system then sends a command using the correct protocol to the ECU. A timer can be activated in response to the forwarding of the command allowing the ECU a predefined amount of time to respond before timing out, and thus, indicating that no data is to be received. In many instances, however, several communications back-and-forth will occur on any given protocol's bus.

Further in some embodiments, the ECU interface system evaluates communications on the appropriate protocol bus to identify communications intended for the user device and/or ECU interface system. The ECU interface system receives a completed message, in some cases does not parse it completely. In some instances, when the first two bytes did not match the bytes specified by the SAE J1979 standard for diagnostic tools, the ECU interface system can disregard the message. Similarly in some embodiments, the ECU interface system can also disregard messages that are not at least five bytes long (three for the header, one for error checking, and at least one for data). Once it is determined the communications from the ECU pass one or both of these conditions and/or other relevant conditions, the communications are stored, for example, in a multi-dimensional array used as a buffer. Once messages are not received for a certain amount of time, referred to in some instances as a time-out period, the content of the buffer are printed out. The ECU interface system completes the process by sending a carriage return, new line or other relevant indicator (e.g., a ">" indicator) to the user device, indicating that the ECU interface system is ready to receive the next command.

As described above, some embodiments further provide protection and/or a safety net in pairing with the ECU interface system. This can be important in some instances, such as in some embodiments that utilize wireless communication, such as Bluetooth communication. A device-enable and/or activation button 236 can cause an interrupt to occur allowing a user device to establish a connection with the ECU as long as the pairing occurs within a prescribed time period (e.g., within 5 minutes, one minute, 30 seconds, or other relevant time periods). When the user device does not attempt to communicate with the ECU within the time limit, it and other devices are prevented from accessing the ECU and will not be allowed to communicate with the ECU again until the activation button is pressed. In some implementations, the user device is initially paired with the Bluetooth module and then the pairing activation button 236 is pressed such that the controller 222 allows the user device 126 to communicate with the ECU 124. When the user device closes its connection, a command is forwarded to the ECU interface system that locks the controller 222 preventing accessed until the activation button is pressed again.

Many diagnostic tools have limited use and are generally only available for professional mechanics. These tools are often bulky, expensive, and complex in their use, limiting their appeal for the general consumer. The present embodiments provide a diagnostic tool that can be owned and utilized by the average automobile owner. The ECU interface system 122 transmits data to and from the ECU 124 of an automobile or other device at the proper voltages and timings for one or more of at least each of the nine communication protocols within the OBD-II standard. Further, the ECU interface system enables secure wireless communication while having very small dimensions and profile.

Further, the present embodiments provide an easy-to-use method for accessing and making use of diagnostic information. Additionally, many embodiments are compact and some can be directly connected or plugged into the ECU port underneath the dash of an automobile and kept there. Still further, some embodiments employ Bluetooth wireless communication, so that the ECU interface system 122 can communicate wirelessly to a cell phone, Personal Digital Assistant (PDA), laptop computer, on-board navigation system and/or other devices. The ECU interface system paired with a user interface on the laptop, cell phone, PDA, navigation device and/or other devices, permits the average automobile owner to monitor the performance of an automobile, identify the source or sources of mechanical problems, control the display of dashboard alerts such as the "Check Engine" light, and/or other functions. In addition, the Bluetooth 2.0 capability achieved through some Bluetooth modules according to some embodiments allows for the use as a wireless control hub that would permit integration of other Bluetooth-enabled mobile and on-board devices.

The controller 222 (which can be implemented through a microcontroller in some embodiments) provides a way to communicate between an ECU and Bluetooth module and the Bluetooth module provides communication between the ECU interface system and a client or user device. Further, the controller permits an OBDII scanner to communicate with an ECU, while some embodiments further integrate a means of making the controller 222 secure for pairing with Bluetooth enabled user devices. Commands are recognized in some implementations to allow interfacing with the user device using customized commands and/or language (e.g., "$", "?" and/or "&" commands). The Bluetooth module provides a way to wirelessly communicate between controller and user device. The activation button enhances security by granting access from the user device to the ECU. The voltage level circuitry adjusts voltages in the exchange between the ECU and the controller and/or the Bluetooth module and the controller (e.g., voltages adjusted using signaling transistors to match appropriate levels for the controller and Bluetooth module).

As described above, some embodiments can identify a protocol to be used with an ECU. This protocol identification can include sending a series of messages corresponding to each protocol in a prescribed order, where in some instances, such as for some protocols, the prescribed order proceeds according to existing standard, while other protocols are defined by the ECU interface system. A response to a protocol inquiry typically dictates which protocol the ECU is using. Once an appropriate protocol is identified (either by detecting the protocol, being informed of the protocol (e.g., by the user) and/or knowing the protocol (e.g., based on prior coupling and/or pairing with the ECU, where in some embodiments, the protocol for one or more previous ECUs can be stored)), data can be sent and received using the appropriate protocol (with, in some embodiments, a different on-board communication system conforming to each protocol), where commands are received from the user device and sent on the appropriate protocol to the ECU. The interface system waits for a response if any, tests the response to verify that the ECU interface system is the intended receiver (e.g., looking for header information, identifier or other verification), stores multiple messages in a multidimensional buffer, and prints or forwards responses back to the user device.

While the invention herein disclosed has been described by means of specific embodiments and applications thereof, numerous modifications and variations could be made thereto by those skilled in the art without departing from the scope of the invention set forth in the claims.

What is claimed is:

1. A method of communicating with an Engine Control Unit (ECU), comprising:

establishing a wireless communication link with a remote device;

coupling with an ECU;

pairing the remote device with the ECU;

identifying a protocol to communicate with the ECU; and transferring communications between the remote device and the ECU.

2. The method of claim 1, wherein the pairing comprises:

determining whether a pairing connection command is received;

determining whether a pairing request is received;

determining whether the pairing request is received within a pairing threshold time period from receiving the pairing connection command when it is determined that the pairing connection command was received and the pairing request was received; and implementing the pairing of the remote device with the ECU when the pairing request is received within the pairing threshold time period from receiving the pairing connection command.

3. The method of claim 1, further comprising:

detecting a first time of a rising edge;

detecting a second time of a falling edge;

determining a time difference between the first time of the rising edge and the second time of falling edge and determining a bit value according to the time difference.

4. The method of claim 1, further comprising:

detecting a first time of a first falling edge;

detecting a second time of a second subsequent falling edge;

determining a time difference between the first time and the second time; and determining a bit value according to the time difference.

5. The method of claim 1, further comprising:

detecting a logic level transition;

determining a time since previous logic level transition; and determining a bit value according to the determined time since the previous logic level transition.

6. The method of claim 1, wherein the receiving the pairing request comprises receiving an access code, and confirming the access code is associated with the ECU.

7. The method of claim 1, wherein the wireless connection comprises a Bluetooth connection.

8. An apparatus that provides communication with an Engine Control Unit (ECU), the apparatus comprising:

a transceiver;

a controller coupled with the transceiver such that the transceiver receives communications from the controller and externally transmits the communications, and further receives and forwards received external communications to the controller; and an interface coupled between the controller and the ECU, where the interface interfaces communications between the controller and the ECU.

9. The apparatus of claim 8, further comprising:

an activation button coupled with the controller that triggers a pairing command at the controller in response to an activation of the activation button.

10. The apparatus of claim 8, further comprising:

a voltage adjustment circuitry coupled between the controller and the transceiver that provides voltage adjustment of communications between the controller and the transceiver.

11. The apparatus of claim 10, wherein the voltage adjustment circuitry comprises first and second inverting Negative-Positive-Negative (NPN) transistors.

12. The apparatus of claim 11, further comprising:

a first pull-up resistor coupled with the first NPN transistor and a second pull-up resistor coupled with the second NPN transistor.

13. The apparatus of claim 8, further comprising:

a resistor-capacitor network that extends a duration that a reset signal is active relative to a length of the received reset signal.

14. The apparatus of claim 13, wherein the resistor-capacitor network extends the length of the reset signal to at least about 5 ms.

15. A method of communicating with an Engine Control Unit (ECU), comprising:

receiving a pairing connection command;

receiving a pairing request from a remote device;

determining whether the pairing request is received within a pairing threshold time since the receiving of the connection command; and pairing the remote device with an ECU when it is determined that the pairing request is received within the pairing threshold time.

16. The method of claim 15, further comprising:

transmitting a first request using a first protocol to an ECU;

determining whether a first response is received to the first request;

transmitting a second request using a second protocol to an ECU when there is no response to the first request;

determining whether a second response is received to the second request;

registering the first protocol when it is determined that the first response is received; and registering the second protocol when it is determined that the second response is received.

17. The method of claim 16, further comprising:

activating timer in response to the transmission of each of the plurality of requests; and activating a subsequent one of the plurality of requests when the response is not received within a threshold time period of the transmission.

* * * * *